United States Patent [19]

Ohgose et al.

[11] Patent Number: 5,724,278
[45] Date of Patent: Mar. 3, 1998

[54] APPARATUS FOR INVERSE DISCRETE COSINE TRANSFORM

[75] Inventors: Hideyuki Ohgose, Neyagawa; Takatoshi Nada, Tsuzuki-gun, both of Japan

[73] Assignee: Matsushita Electric Industrial Co., Ltd., Osaka-fu, Japan

[21] Appl. No.: 568,096

[22] Filed: Dec. 6, 1995

[30] Foreign Application Priority Data

Dec. 6, 1994 [JP] Japan .................................. 6-301872
Oct. 26, 1995 [JP] Japan .................................. 7-278947

[51] Int. Cl.$^6$ .................................................. G06F 17/14
[52] U.S. Cl. .......................................... 364/725.02
[58] Field of Search ........................... 364/725.02, 725.01

[56] References Cited

U.S. PATENT DOCUMENTS 5,181,183  1/1993  Miyazaki .................................. 364/725

FOREIGN PATENT DOCUMENTS

| 0 416 311 | 3/1991 | European Pat. Off. |
| 0 468 165 | 1/1992 | European Pat. Off. |
| 0 544 356 | 6/1993 | European Pat. Off. |
| 0 581 714 | 2/1994 | European Pat. Off. |
| 0 588 726 | 3/1994 | European Pat. Off. |

OTHER PUBLICATIONS

Ephraim Feig et al. "Fast Algorithms for the Discrete Cosine Transform"; *IEEE Transactions on Signal Processing*, vol. 40, No. 9, Sep. 1992; pp. 2174–2193.

IEEE Transactions on Signal Processing, "Fast Algorithms for the Discrete Cosine Transform", vol. 40, No. 9, Sep. 1992, pp. 2174–2193.

IEEE Proceedings, "Direct Methods for Computing Discrete Sinusoidal Transforms", vol. 137, No. 6, Dec. 1990, pp. 433–442.

Proceedings of the IEEE 1992 Custom Integrated Circuits Conference; "A 160 MPIXEL/SEC IDCT Processor For HDTV"; Boston, May 3–6, 1992; pp. 26.4.1–26.4.4

*Primary Examiner*—Tan V. Mai
*Attorney, Agent, or Firm*—Panitch Schwarze Jacobs & Nadel, P.C.

[57] ABSTRACT

An inverse discrete cosine transform apparatus has operation units for operating a combination of plural basic operation matrixes, including rearrangement, addition, subtraction and multiplication. A coefficient C of multiplication is defined as $C=\cos(n\pi/16)$ (n:integer), and the basic operation matrixes are represented by equation (6), and operations of matrixes of addition and subtraction are carried out prior to operations of respective matrixes of multiplication.

6 Claims, 12 Drawing Sheets

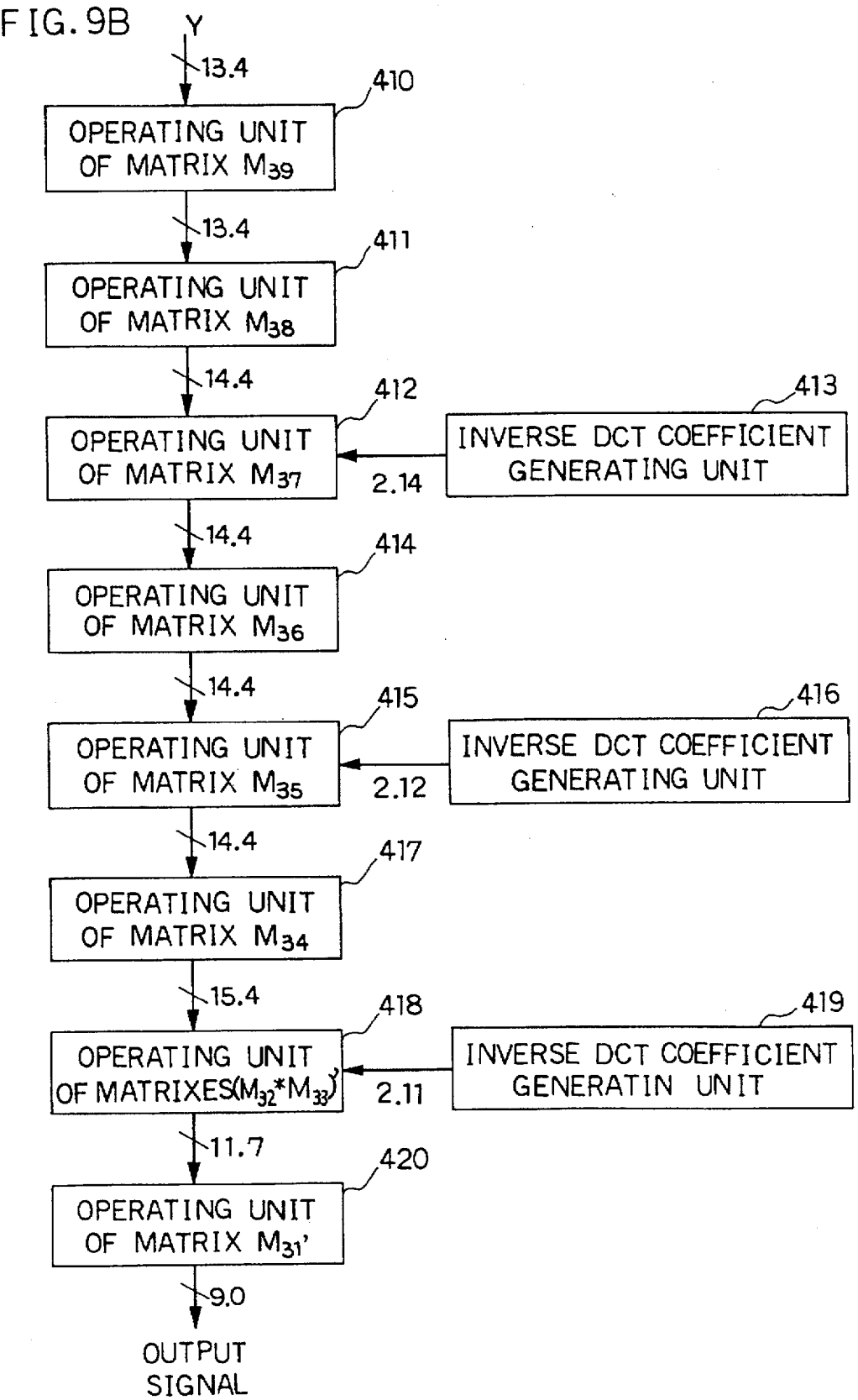

APPARATUS FOR INVERSE DISCRETE COSINE TRANSFORM

FIELD OF THE INVENTION AND RELATED ART STATEMENT

1. Field of the Invention

The present invention relates generally to a decoding apparatus for decoding data of a video signal compressed by discrete cosine transform in a communication system and a stored media system such as a video disk and a video tape, and more particularly to an inverse discrete cosine transform apparatus which is used for a band width compression processing system of the video signal.

2. Description of the Related Art

In DCT (discrete cosine transform) and IDCT (inverse DCT) which are used for MPEG (moving picture image coding experts group) of a conventional band width compression process of a video signal, a circuit can be configured by an LSI by using a fast algorithm to reduce amount of computation. An example of the fast algorithm is disclosed in the prior art of a paper of "Fast Algorithms for the Discrete Cosine Transform", written by Ephraim Feig and Shmuel Winograd, IEEE Transaction on Signal Processing, September 1992. According to the paper, the amount of computation is reduced by decreasing frequencies of addition and subtraction, multiplication or the like. As to the order of the computations in the fast algorithm, the addition and subtraction is carried out after the multiplication. All multipliers in the multiplications are coefficients of cosine, therefore an error is produced by the multiplication. The error produced by the multiplication is accumulated in a subsequent addition and subtraction as an error of computation result. In order to keep a predetermined accuracy in a final output signal, the number of bits for the coefficient of cosine must be increased, and the number of bits of resultant data of the computation must be also increased. Consequently, there is a problem that a scale of circuit inevitably increases when the computation is carried out by a hardware.

OBJECT AND SUMMARY OF THE INVENTION

The present invention is to solve the above-mentioned problems in the prior art.

An object of the present invention is to provide an inverse discrete cosine transform apparatus which is capable of decreasing the number of bits after operations of basic operation matrixes and keeping a desired accuracy in a final output signal.

Another object of the present invention is to provide an inverse discrete cosine transform apparatus including a two-dimensional inverse discrete cosine transform apparatus for attaining the above-mentioned object and decreasing the number of operating units by improving a low-column transposition method.

In order to attain the above-mentioned objects, the inverse discrete cosine transform apparatus is configured by combining plural operating units for basic operation matrixes such as rearrangement matrix, addition and subtraction matrix and multiplication matrix, such that the operations of addition and subtraction matrix are carried out prior to operation of the multiplication matrix at all times. Consequently, a frequency of the addition and subtraction after the multiplication can be reduced, and accumulation of an error after the addition and subtraction decreases.

BRIEF DESCRIPTION OF THE DRAWINGS

FIG. 9A and FIG. 9B in combination show a detailed block diagram of the two-dimensional inverse discrete cosine transform apparatus of the second embodiment in accordance with the present invention.

DETAILED DESCRIPTION OF THE PREFERRED EMBODIMENTS

Figure 1:
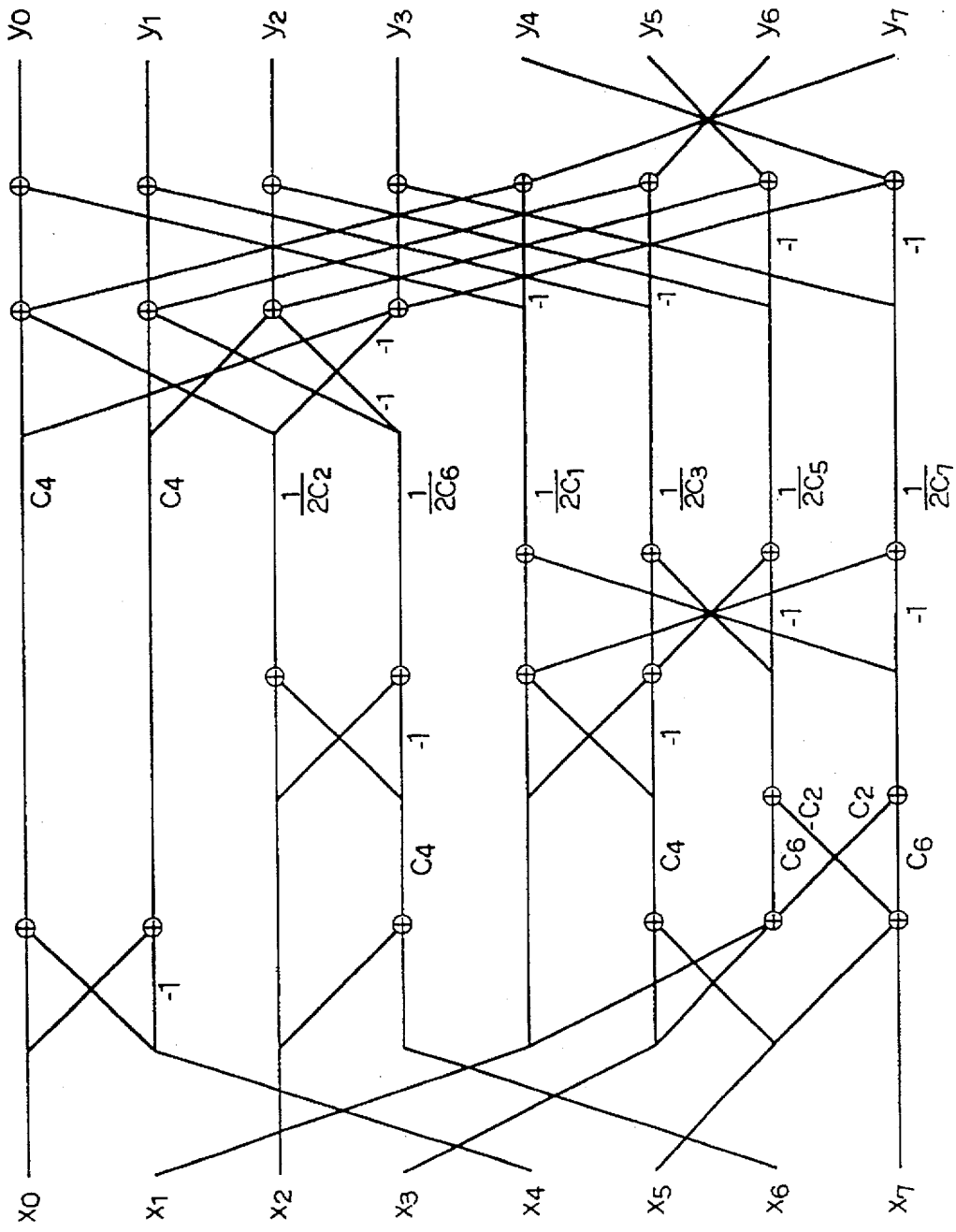
FIG. 1 is a diagram representing process of signals in the inverse discrete cosine transform apparatus in a first embodiment in accordance with the present invention.

Preferred embodiments of the present invention will be described hereinafter with reference to the accompanying drawings.

[First Embodiment]

A first embodiment of the present invention is described with reference to FIG. 1, FIG. 2 and FIG. 3.

It is known that there are four kinds of inverse discrete cosine transform (hereinafter is referred to as inverse DCT), namely a first kind through a fourth kind. The present invention relates to the inverse DCT of the second kind. A coefficient of an eight inputs inverse DCT in the first embodiment is represented by equation (1).

$$\frac{1}{2} k_n \cos\left(\frac{(2m+1)n}{16}\pi\right) \quad (1)$$

$$\left( \begin{array}{c} m, n = 0, 1, \ldots 7 \\ k_n = \left\{ \begin{array}{l} 1 \ldots n \neq 0 \\ \frac{1}{\sqrt{2}} \ldots n = 0 \end{array} \right. \end{array} \right)$$

Equation (2) representing a fast algorithm of the prior art is derived by expanding the equation (1).

$$\begin{bmatrix} y_0 \\ y_1 \\ y_2 \\ y_3 \\ y_4 \\ y_5 \\ y_6 \\ y_7 \end{bmatrix} = \frac{1}{2} \overset{M_{11}}{\begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 0 & 0 & 0 & 1 & 0 & 0 & 0 & -1 \\ 0 & 0 & 1 & 0 & 0 & 0 & -1 & 0 \\ 0 & 1 & 0 & 0 & 0 & -1 & 0 & 0 \\ 1 & 0 & 0 & 0 & -1 & 0 & 0 & 0 \end{bmatrix}}$$

$$\overset{M_{12}}{\begin{bmatrix} 1 & 0 & 1 & 0 & 0 & 0 & 0 & 0 \\ 0 & 1 & 0 & 1 & 0 & 0 & 0 & 0 \\ 0 & 1 & 0 & -1 & 0 & 0 & 0 & 0 \\ 1 & 0 & -1 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}}$$

$$\overset{M_{13}}{\begin{bmatrix} 1 & -1 & 0 & 0 & 0 & 0 & 0 & 0 \\ 1 & 1 & 0 & 0 & 0 & 0 & 0 & 0 \\ 0 & 0 & 0 & 1 & 0 & 0 & 0 & 0 \\ 0 & 0 & 1 & -1 & 0 & 0 & 0 & 0 \\ 0 & 0 & 0 & 0 & 0 & -1 & 1 & 0 \\ 0 & 0 & 0 & 0 & 0 & 0 & 0 & 1 \\ 0 & 0 & 0 & 0 & -1 & 0 & -1 & 0 \\ 0 & 0 & 0 & 0 & 0 & 1 & 0 & 1 \end{bmatrix}}$$

$$\overset{M_{14}}{\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & c_4 & 0 & 0 & 0 & 0 \\ 0 & 0 & 0 & 0 & 1 & 0 & 0 & 0 \\ 0 & 0 & 0 & 0 & 0 & c_4 & 0 & 0 \\ 0 & 0 & 0 & 0 & 0 & 0 & c_6 & -c_2 \\ 0 & 0 & 0 & 0 & 0 & 0 & c_2 & c_6 \end{bmatrix}}$$

$$\overset{M_{15}}{\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & -1 & 0 & 0 & 0 & 0 \\ 0 & 0 & 1 & 1 & 0 & 0 & 0 & 0 \\ 0 & 0 & 0 & 0 & 1 & -1 & -1 & 1 \\ 0 & 0 & 0 & 0 & 1 & 1 & -1 & 1 \\ 0 & 0 & 0 & 0 & -1 & 0 & -1 & 0 \\ 0 & 0 & 0 & 0 & 0 & 1 & 0 & 1 \end{bmatrix}}$$

$$\overset{M_{16}}{\begin{bmatrix} c_4 & 0 & 0 & 0 & 0 & 0 & 0 & 0 \\ 0 & c_4 & 0 & 0 & 0 & 0 & 0 & 0 \\ 0 & 0 & \frac{1}{2c_6} & 0 & 0 & 0 & 0 & 0 \\ 0 & 0 & 0 & \frac{1}{2c_2} & 0 & 0 & 0 & 0 \\ 0 & 0 & 0 & 0 & \frac{1}{2c_5} & 0 & 0 & 0 \\ 0 & 0 & 0 & 0 & 0 & \frac{1}{2c_1} & 0 & 0 \\ 0 & 0 & 0 & 0 & 0 & 0 & \frac{1}{2c_3} & 0 \\ 0 & 0 & 0 & 0 & 0 & 0 & 0 & \frac{1}{2c_7} \end{bmatrix}}$$

$$\overset{M_{17}}{\begin{bmatrix} 1 & 0 & 0 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 0 & 1 \end{bmatrix}} \begin{bmatrix} x_0 \\ x_1 \\ x_2 \\ x_3 \\ x_4 \\ x_5 \\ x_6 \\ x_7 \end{bmatrix} \quad (2)$$

In equation (2), a third matrix $M_{13}$, a fourth matrix $M_{14}$, a fifth matrix $M_{15}$ and a sixth matrix $M_{16}$ are operated, and equation (3) is derived.

$$\begin{bmatrix} 1 & -1 & 0 & 0 & 0 & 0 & 0 & 0 \\ 1 & 1 & 0 & 0 & 0 & 0 & 0 & 0 \\ 0 & 0 & 0 & 1 & 0 & 0 & 0 & 0 \\ 0 & 0 & 1 & -1 & 0 & 0 & 0 & 0 \\ 0 & 0 & 0 & 0 & 0 & -1 & 1 & 0 \\ 0 & 0 & 0 & 0 & 0 & 0 & 0 & 1 \\ 0 & 0 & 0 & 0 & -1 & 0 & -1 & 0 \\ 0 & 0 & 0 & 0 & 0 & 1 & 0 & 1 \end{bmatrix} \quad (3)$$

$$\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & c_4 & 0 & 0 & 0 & 0 \\ 0 & 0 & 0 & 0 & 1 & 0 & 0 & 0 \\ 0 & 0 & 0 & 0 & 0 & c_4 & 0 & 0 \\ 0 & 0 & 0 & 0 & 0 & 0 & c_6 & -c_2 \\ 0 & 0 & 0 & 0 & 0 & 0 & c_2 & c_6 \end{bmatrix}$$

$$\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & -1 & 0 & 0 & 0 & 0 \\ 0 & 0 & 1 & 1 & 0 & 0 & 0 & 0 \\ 0 & 0 & 0 & 0 & 1 & -1 & -1 & 1 \\ 0 & 0 & 0 & 0 & 1 & 1 & -1 & 1 \\ 0 & 0 & 0 & 0 & -1 & 0 & -1 & 0 \\ 0 & 0 & 0 & 0 & 0 & 1 & 0 & 1 \end{bmatrix}$$

$$\begin{bmatrix} c_4 & 0 & 0 & 0 & 0 & 0 & 0 & 0 \\ 0 & c_4 & 0 & 0 & 0 & 0 & 0 & 0 \\ 0 & 0 & \frac{1}{2c_6} & 0 & 0 & 0 & 0 & 0 \\ 0 & 0 & 0 & \frac{1}{2c_2} & 0 & 0 & 0 & 0 \\ 0 & 0 & 0 & 0 & \frac{1}{2c_5} & 0 & 0 & 0 \\ 0 & 0 & 0 & 0 & 0 & \frac{1}{2c_1} & 0 & 0 \\ 0 & 0 & 0 & 0 & 0 & 0 & \frac{1}{2c_3} & 0 \\ 0 & 0 & 0 & 0 & 0 & 0 & 0 & \frac{1}{2c_7} \end{bmatrix} =$$

$$\begin{bmatrix} c_4 & c_4 & 0 & 0 & 0 & 0 & 0 & 0 \\ c_4 & -c_4 & 0 & 0 & 0 & 0 & 0 & 0 \\ 0 & 0 & c_2 & c_6 & 0 & 0 & 0 & 0 \\ 0 & 0 & c_6 & -c_2 & 0 & 0 & 0 & 0 \\ 0 & 0 & 0 & 0 & c_1 & c_3 & c_5 & c_7 \\ 0 & 0 & 0 & 0 & c_3 & -c_7 & -c_1 & -c_5 \\ 0 & 0 & 0 & 0 & c_5 & -c_1 & c_7 & c_3 \\ 0 & 0 & 0 & 0 & c_7 & -c_5 & c_3 & -c_1 \end{bmatrix} = \begin{bmatrix} G_1 & & \\ & G_2 & \\ & & G_3 \end{bmatrix}$$

Matrixes $G_1$, $G_2$ and $G_3$ in equation (3) are deformed to 2 rows and 2 columns matrixes $G_1$ and $G_2$ and 4 rows and 4 columns matrix $G_3$ as shown in equation (4) so that operation of a multiplication matrix is carried out after operation of an addition and subtraction matrix.

$$G_1 = \begin{bmatrix} c_4 & 0 \\ 0 & c_4 \end{bmatrix} \begin{bmatrix} 1 & 0 \\ 0 & 1 \end{bmatrix} \begin{bmatrix} 1 & 0 \\ 0 & 1 \end{bmatrix} \begin{bmatrix} 1 & 1 \\ 1 & -1 \end{bmatrix}$$

$$G_2 = \begin{bmatrix} \frac{1}{2c_2} & \\ & \frac{1}{2c_6} \end{bmatrix} \begin{bmatrix} 1 & 1 \\ 1 & -1 \end{bmatrix} \begin{bmatrix} 1 & 0 \\ 0 & c_4 \end{bmatrix} \begin{bmatrix} 1 & 0 \\ 1 & 1 \end{bmatrix}$$

$$G_3 = \begin{bmatrix} \frac{1}{2c_1} & & & \\ & \frac{1}{2c_3} & & \\ & & \frac{1}{2c_5} & \\ & & & \frac{1}{2c_7} \end{bmatrix} \begin{bmatrix} 1 & 1 & 0 & 1 \\ 1 & -1 & 1 & 0 \\ 1 & -1 & -1 & 0 \\ 1 & 1 & 0 & -1 \end{bmatrix} \begin{bmatrix} 1 & 0 & 0 & 0 \\ 0 & c_4 & 0 & 0 \\ 0 & 0 & c_6 & -c_2 \\ 0 & 0 & c_2 & c_6 \end{bmatrix} \begin{bmatrix} 1 & 0 & 0 & 0 \\ 0 & 1 & 1 & 0 \\ 1 & 1 & 0 & 0 \\ 0 & 0 & 1 & 1 \end{bmatrix}$$ (4)

Equation (5) is derived by combining three matrixes $G_1$, $G_2$ and $G_3$ in equation (4) and replacing with the matrixes $M_{13}$, $M_{14}$, $M_{15}$ and $M_{16}$ from the third to the sixth in equation (2).

$$\begin{bmatrix} y_0 \\ y_1 \\ y_2 \\ y_3 \\ y_4 \\ y_5 \\ y_6 \\ y_7 \end{bmatrix} = \frac{1}{2} \overset{M_{21}}{\begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 0 & 0 & 0 & 1 & 0 & 0 & 0 & -1 \\ 0 & 0 & 1 & 0 & 0 & 0 & -1 & 0 \\ 0 & 1 & 0 & 0 & 0 & -1 & 0 & 0 \\ 1 & 0 & 0 & 0 & -1 & 0 & 0 & 0 \end{bmatrix}} \quad (5)$$

$$M_{22} = \begin{bmatrix} 1 & 0 & 1 & 0 & 0 & 0 & 0 & 0 \\ 0 & 1 & 0 & 1 & 0 & 0 & 0 & 0 \\ 0 & 1 & 0 & -1 & 0 & 0 & 0 & 0 \\ 1 & 0 & -1 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}$$

$$M_{23} = \begin{bmatrix} c_4 & 0 & 0 & 0 & 0 & 0 & 0 & 0 \\ 0 & c_4 & 0 & 0 & 0 & 0 & 0 & 0 \\ 0 & 0 & \frac{1}{2c_2} & 0 & 0 & 0 & 0 & 0 \\ 0 & 0 & 0 & \frac{1}{2c_6} & 0 & 0 & 0 & 0 \\ 0 & 0 & 0 & 0 & \frac{1}{2c_1} & 0 & 0 & 0 \\ 0 & 0 & 0 & 0 & 0 & \frac{1}{2c_3} & 0 & 0 \\ 0 & 0 & 0 & 0 & 0 & 0 & \frac{1}{2c_5} & 0 \\ 0 & 0 & 0 & 0 & 0 & 0 & 0 & \frac{1}{2c_7} \end{bmatrix}$$

$$M_{24} = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 1 & 0 & 0 & 0 & 0 \\ 0 & 0 & 1 & -1 & 0 & 0 & 0 & 0 \\ 0 & 0 & 0 & 0 & 1 & 1 & 0 & 1 \\ 0 & 0 & 0 & 0 & 1 & -1 & 1 & 0 \\ 0 & 0 & 0 & 0 & 1 & -1 & -1 & 0 \\ 0 & 0 & 0 & 0 & 1 & 1 & 0 & -1 \end{bmatrix}$$

$$M_{25} = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & c_4 & 0 & 0 & 0 & 0 \\ 0 & 0 & 0 & 0 & 1 & 0 & 0 & 0 \\ 0 & 0 & 0 & 0 & 0 & c_4 & 0 & 0 \\ 0 & 0 & 0 & 0 & 0 & 0 & c_6 & -c_2 \\ 0 & 0 & 0 & 0 & 0 & 0 & c_2 & c_6 \end{bmatrix}$$

$$M_{26} = \begin{bmatrix} 1 & 1 & 0 & 0 & 0 & 0 & 0 & 0 \\ 1 & -1 & 0 & 0 & 0 & 0 & 0 & 0 \\ 0 & 0 & 1 & 0 & 0 & 0 & 0 & 0 \\ 0 & 0 & 1 & 1 & 0 & 0 & 0 & 0 \\ 0 & 0 & 0 & 0 & 1 & 0 & 0 & 0 \\ 0 & 0 & 0 & 0 & 0 & 1 & 1 & 0 \\ 0 & 0 & 0 & 0 & 1 & 1 & 0 & 0 \\ 0 & 0 & 0 & 0 & 0 & 0 & 1 & 1 \end{bmatrix}$$

$$M_{27} \begin{bmatrix} x_0 \\ x_1 \\ x_2 \\ x_3 \\ x_4 \\ x_5 \\ x_6 \\ x_7 \end{bmatrix} = \begin{bmatrix} 1 & 0 & 0 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 0 & 1 \end{bmatrix} \begin{bmatrix} x_0 \\ x_1 \\ x_2 \\ x_3 \\ x_4 \\ x_5 \\ x_6 \\ x_7 \end{bmatrix}$$

Hereupon, equation (5) is substantially identical with equation (6) cited in claim 1.

$$\begin{bmatrix} y_0 \\ y_1 \\ y_2 \\ y_3 \\ y_4 \\ y_5 \\ y_6 \\ y_7 \end{bmatrix} = \frac{1}{2} \begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 0 & 0 & 0 & 1 & 0 & 0 & 0 & -1 \\ 0 & 0 & 1 & 0 & 0 & 0 & -1 & 0 \\ 0 & 1 & 0 & 0 & 0 & -1 & 0 & 0 \\ 1 & 0 & 0 & 0 & -1 & 0 & 0 & 0 \end{bmatrix} \quad (6)$$

$$\begin{bmatrix} 1 & 0 & 1 & 0 & 0 & 0 & 0 & 0 \\ 0 & 1 & 0 & 1 & 0 & 0 & 0 & 0 \\ 0 & 1 & 0 & -1 & 0 & 0 & 0 & 0 \\ 1 & 0 & -1 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}$$

$$\begin{bmatrix} c_4 & 0 & 0 & 0 & 0 & 0 & 0 & 0 \\ 0 & c_4 & 0 & 0 & 0 & 0 & 0 & 0 \\ 0 & 0 & \frac{1}{2c_2} & 0 & 0 & 0 & 0 & 0 \\ 0 & 0 & 0 & \frac{1}{2c_6} & 0 & 0 & 0 & 0 \\ 0 & 0 & 0 & 0 & \frac{1}{2c_1} & 0 & 0 & 0 \\ 0 & 0 & 0 & 0 & 0 & \frac{1}{2c_3} & 0 & 0 \\ 0 & 0 & 0 & 0 & 0 & 0 & \frac{1}{2c_5} & 0 \\ 0 & 0 & 0 & 0 & 0 & 0 & 0 & \frac{1}{2c_7} \end{bmatrix}$$

-continued $$\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 1 & 0 & 0 & 0 & 0 \\ 0 & 0 & 1 & -1 & 0 & 0 & 0 & 0 \\ 0 & 0 & 0 & 0 & 1 & 1 & 0 & 1 \\ 0 & 0 & 0 & 0 & 1 & -1 & 1 & 0 \\ 0 & 0 & 0 & 0 & 1 & -1 & -1 & 0 \\ 0 & 0 & 0 & 0 & 1 & 1 & 0 & -1 \end{bmatrix}$$

$$\begin{bmatrix} 1 & 0 & 0 & 0 & 0 & 0 & 0 \\ 0 & 1 & 0 & 0 & 0 & 0 & 0 \\ 0 & 0 & 1 & 0 & 0 & 0 & 0 \\ 0 & 0 & 0 & c_4 & 0 & 0 & 0 \\ 0 & 0 & 0 & 0 & 1 & 0 & 0 \\ 0 & 0 & 0 & 0 & 0 & c_4 & 0 \\ 0 & 0 & 0 & 0 & 0 & 0 & c_6 & -c_2 \\ 0 & 0 & 0 & 0 & 0 & 0 & c_2 & c_6 \end{bmatrix}$$

$$\begin{bmatrix} 1 & 1 & 0 & 0 & 0 & 0 & 0 \\ 1 & -1 & 0 & 0 & 0 & 0 & 0 \\ 0 & 0 & 1 & 0 & 0 & 0 & 0 \\ 0 & 0 & 1 & 1 & 0 & 0 & 0 \\ 0 & 0 & 0 & 1 & 0 & 0 & 0 \\ 0 & 0 & 0 & 0 & 1 & 1 & 0 \\ 0 & 0 & 0 & 0 & 1 & 1 & 0 & 0 \\ 0 & 0 & 0 & 0 & 0 & 0 & 1 \end{bmatrix}$$

$$\begin{bmatrix} 1 & 0 & 0 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 0 & 1 \end{bmatrix} \begin{bmatrix} x_0 \\ x_1 \\ x_2 \\ x_3 \\ x_4 \\ x_5 \\ x_6 \\ x_7 \end{bmatrix}$$

In equations (2) and (5), a matrix $M_{21}$ in equation (5) is identical with a matrix $M_{11}$ in equation (2), in a similar manner, a matrix $M_{22}$ is identical with a matrix $M_{12}$, a matrix $M_{25}$ is identical with the matrix $M_{14}$ and a matrix $M_{27}$ is identical with a matrix $M_{17}$.

The inverse discrete cosine transform apparatus of the first embodiment is configured so as to operate the matrixes on the basis of equation (5). Consequently, the number of operations of the addition and subtraction matrixes which are carried out prior to operations of the multiplication matrixes increases. "Prior to" does not mean a location of a matrix in equation, but means an order of operation or processing in a time sequence. For example in equation (5), addition and subtraction matrixes $M_{26}$ and $M_{27}$ are operated prior to operation of the multiplication matrix $M_{25}$. Moreover, an addition and subtraction matrix $M_{24}$ is operated prior to operation of a multiplication matrix $M_{23}$.

FIG. 1 is a diagram representing signal processing of the inverse discrete cosine transform apparatus corresponding to equation (5). Referring to FIG. 1, a sign "+" represents addition by an adder. A numeral "−1" represents inversion of a sign by a sign inverter (not shown). $C_1$, $C_2$, $C_3$, $C_4$, $C_5$, $C_6$ and $C_7$ represent multipliers in multiplication. As shown in FIG. 1, the inverse discrete cosine transform apparatus produces a first output signal $y_0$, a second output signal $y_1$, a third output signal $y_2$, a fourth output signal $y_3$, a fifth output signal $y_4$, a sixth output signal $y_5$, a seventh output signal $y_6$ and eighth output signal $y_7$ from a first input signal $x_0$, a second input signal $x_1$, a third input signal $x_2$, a fourth input signal $x_3$, a fifth input signal $x_4$, a sixth input signal $x_5$, a seventh input signal $x_6$ and an eighth input signal $x_7$.

Referring to FIG. 1, the input signals $x_0$–$x_7$ are transmitted rightward along respective lines and a plus sign or a minus sign of each input signal is inverted on a line having a representation of the numeral "−1". An addition of input signals is made at a position having the sign +. The input signal is multiplied by one of multipliers $C_1$–$C_7$ on a line having the said multiplier. Thus, the output signals $y_0$–$y_7$ are produced.

A two-dimensional inverse discrete cosine transform apparatus which is used for the inverse discrete cosine transform apparatus of the present invention is described hereafter. A second basic operation matrix of 64 rows and 64 columns is derived by operating tensor product of the first basic operation matrixes in equation (5). Matrix operation of the second basic operation matrix of 64 rows and 64 columns and an input signal transposed from a matrix of 8 rows and 8 columns to a matrix of 64 rows and 1 column is carried out. Consequently, a signal of a matrix of 64 rows and 1 column is obtained. The two-dimensional inverse discrete cosine transform apparatus can be configured so as to produce a two-dimensional output signal which is transposed from the matrix of 64 rows and 1 column to a matrix of 8 rows and 8 columns. The two-dimensional inverse discrete cosine transform apparatus is configured so as to meet an accuracy of operation of the inverse DCT part of H.261 standard in the CCITT recommendation.

Figure 2:
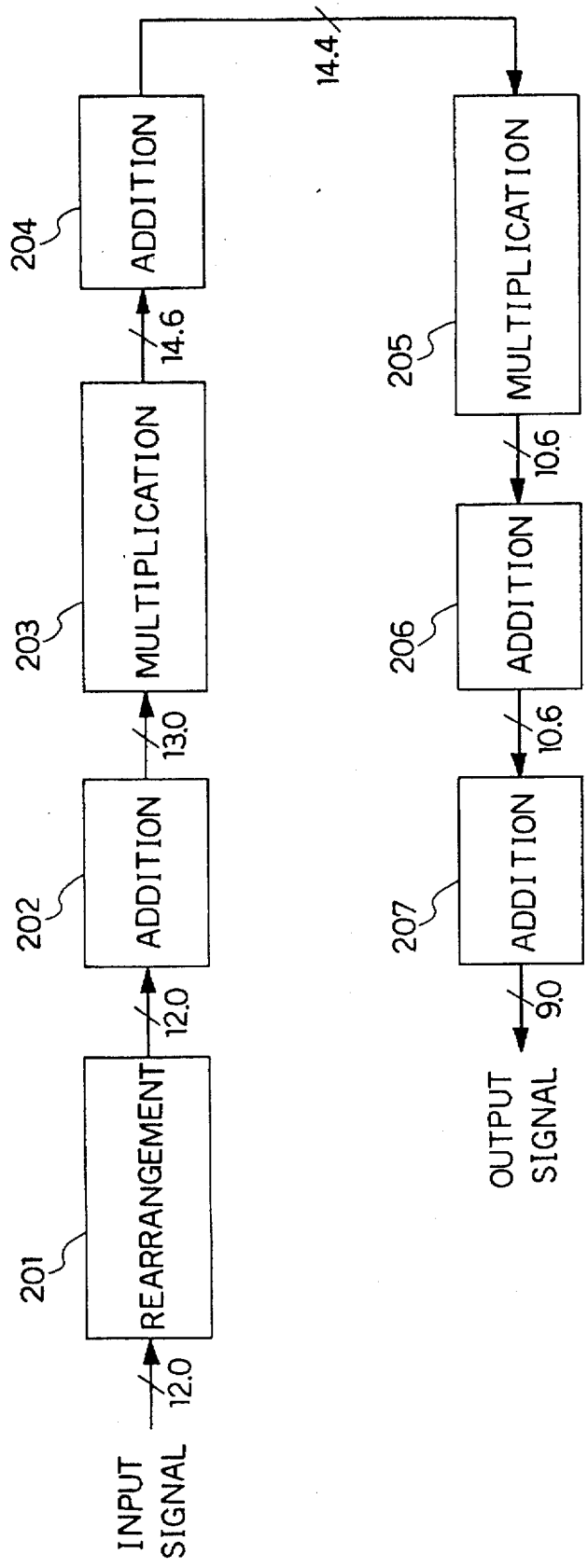
FIG. 2 is a flow chart representing an order of processing steps in a two-dimensional inverse discrete cosine transform apparatus in the first embodiment in accordance with the present invention.

FIG. 2 is a flow chart of a process of the above-mentioned two-dimensional inverse discrete cosine transform apparatus. Referring to FIG. 2, in numeral values 12.0 and 13.0, for example, placed under allows, integral parts represent the number (m) of bits of integral data and decimal parts represent the number (n) of bits of decimal data (m, n:integers). The integers m and n represent respective numbers of bits necessary for output data after operation of the basic operation matrixes. For example, in output data of multiplication 203 having the numeral value 14.6, m=14 and n=6, and therefore, 20 bits is required in total.

In FIG. 2, additions are carried out prior to each multiplication at all times. For example, an addition 202 is carried out prior to a multiplication 203. Furthermore, an addition 204 is carried out prior to a multiplication 205. Consequently, only two additions 206 and 207 are carried out after the multiplication 205. The number of addition operations after multiplication operations is reduced in comparison with the paper of the prior art cited in the "description of the prior art". In the prior art, three additions are carried out after a multiplication as represented by equations 77, 78, 79 and 80 of page 2184 of the paper.

When the operations in FIG. 2 are compared with the matrixes in equation (5), the operation of the matrix $M_{27}$ is equivalent to a rearrangement 201, the operation of the matrix $M_{26}$ is equivalent to the addition 202. The operation of the matrix $M_{25}$ is equivalent to the multiplication 203, and the operation of the matrix $M_{24}$ is equivalent to the addition 204. The operation of the matrix $M_{23}$ is equivalent to the multiplication 205 and the operation of the matrix $M_{22}$ is equivalent to the addition 206. The operation of the matrix $M_{21}$ is equivalent to the addition 207. Required numbers of bits of the data of the input signal and the output signal after the respective matrix operations are as follows:

the data of the input signal . . . 12.0 bits, the data after operation of the seventh matrix $M_{27}$ . . . 12.0 bits, the data after operation of the sixth matrix $M_{26}$ ... 13.0 bits, the data after operation of the fifth matrix $M_{25}$ ... 14.6 bits, the data after operation of the fourth matrix $M_{24}$ ... 14.4 bits, the data after operation of the third matrix $M_{23}$ ... 10.6 bits, the data after operation of the second matrix $M_{22}$ ... 10.6 bits, and the data after operation of the first matrix $M_{21}$ ... 9.0 bits.

A total number of bits of integral parts is 94, and a total number of bits of decimal parts is 22. The number of bits is 116 in total. Since in the prior art Feig et al., the total number of bits necessary for meeting the H.261 standard is estimated 130, a circuit scale of the inverse discrete cosine transform apparatus of the first embodiment is smaller than that of the prior art. Memory circuits such as a latch and a RAM for storing data after operations can be reduced by decreasing the total number of bits, and therefore an area occupied by such memory circuits is also decreased. Moreover, the numbers of bits which are required in operation of the adders and multipliers are also reduced. Assessment result in the case of the first embodiment is shown in table (1). The table (1) represents an assessment based on "The inverse transform accuracy specification of H.261 standard".

TABLE 1

| Range of random members | Peak mean square error for any of 64 IDCT | Overall mean square error of 64 IDCT output pels | Peak mean error for any of 64 IDCT output pels | mean error of 64 IDCT output pels |
| --- | --- | --- | --- | --- |
| −256~255 | 0.029800 | 0.016978 | 0.011200 | 0.000066 |
| −5~5 | 0.024000 | 0.011311 | 0.008600 | 0.000145 |
| −300~300 | 0.027000 | 0.015695 | 0.009000 | 0.000114 |
| H.261 standard values | 0.06 and below | 0.02 and below | 0.015 and below | 0.0015 and below |

As shown in table (1), it is recognized that the first embodiment meets the H.261 standard.

Figure 3A:
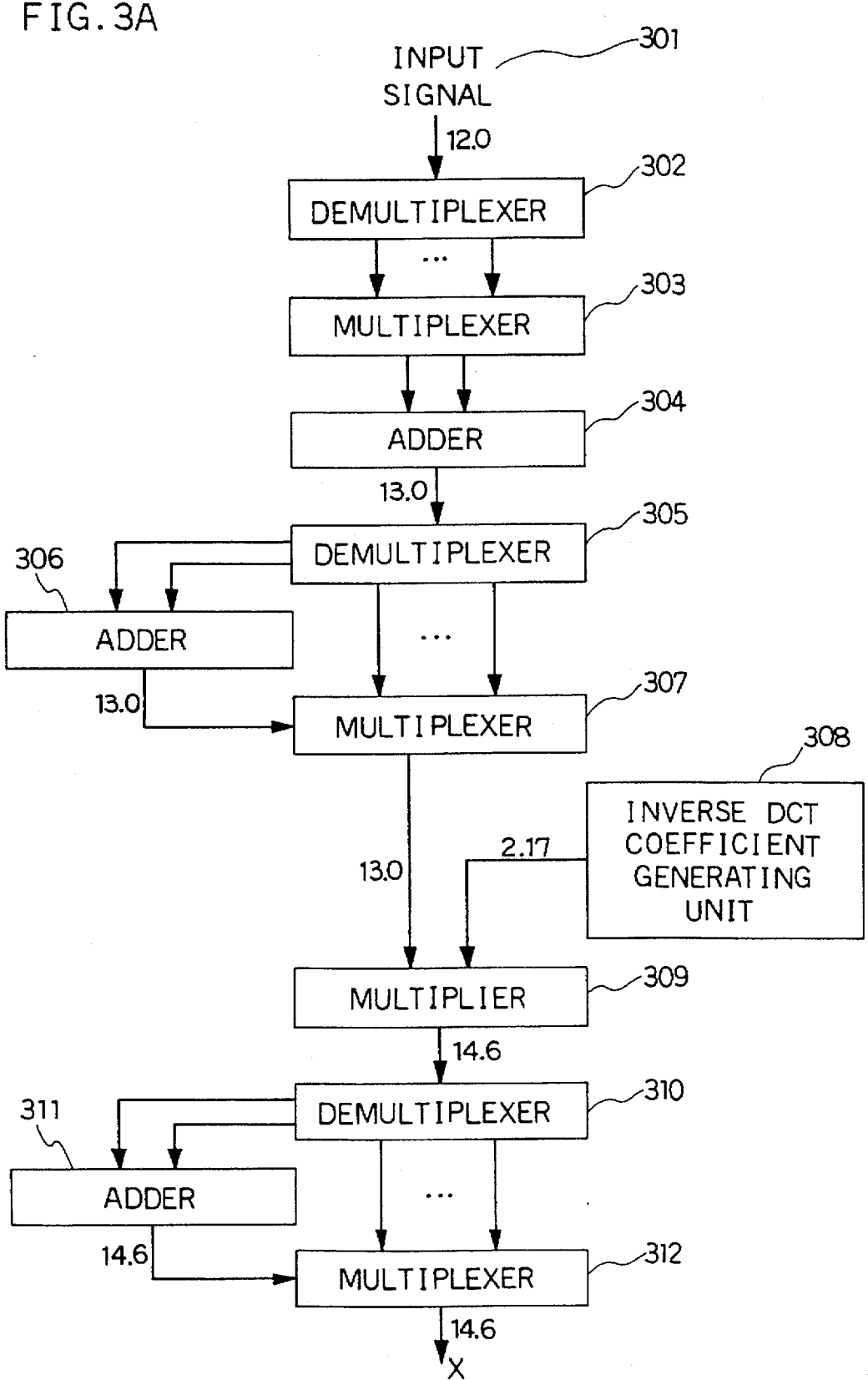
FIG. 3A and FIG. 3B in combination show a detailed block diagram of the two-dimensional inverse discrete cosine transform apparatus of the first embodiment in accordance with the present invention.
Figure 3B:
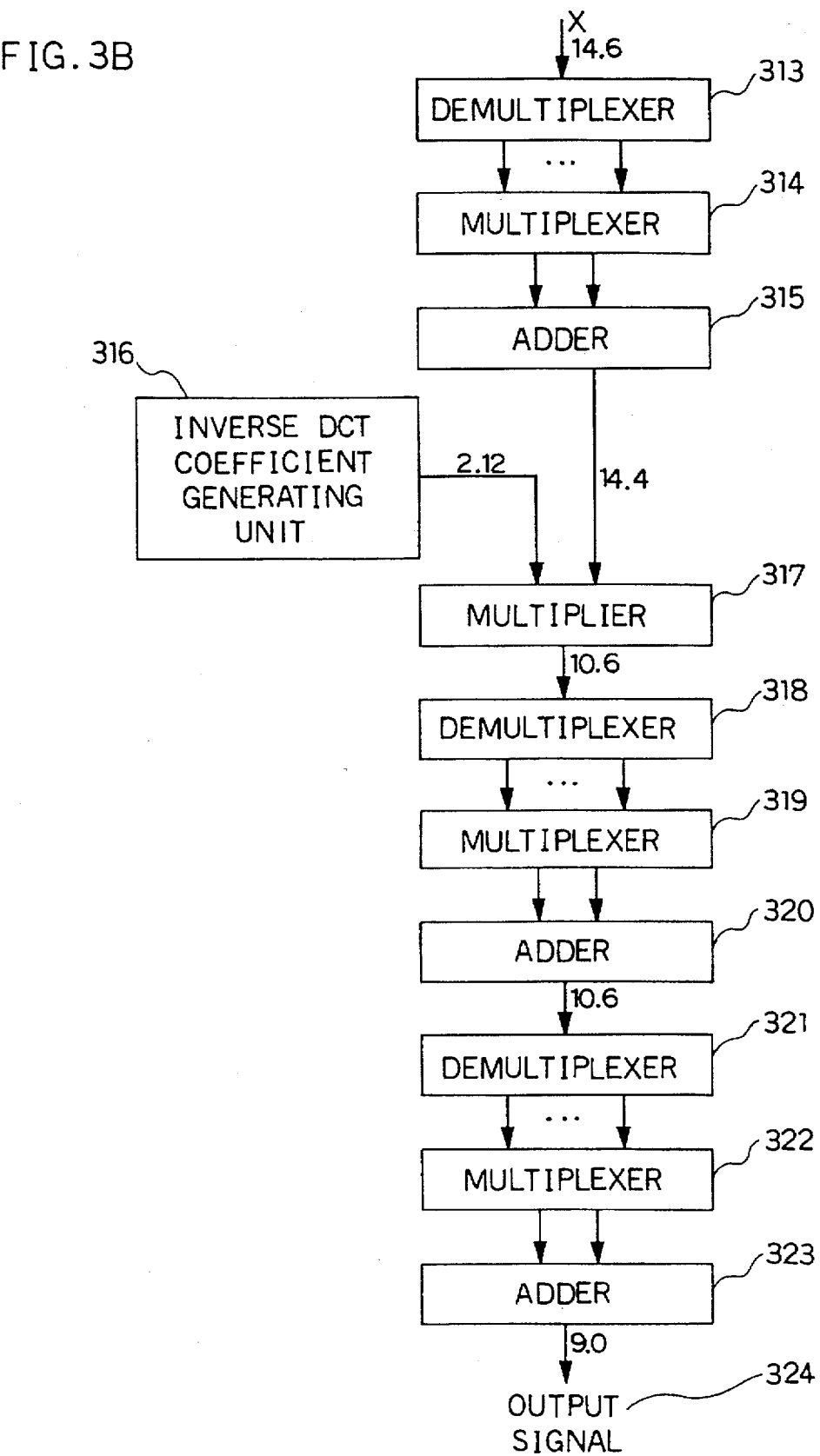

FIG. 3A and FIG. 3B in combination show a detailed block diagram of the two-dimensional inverse discrete cosine transform apparatus for carrying out the operations in FIG. 2. The numeral values 12.0 and 13.0, for example, represent the numbers of bits of data as mentioned above. First, data of an input signal 301 are latched by a demultiplexer 302, and are distributed to built-in memories (not shown) and held thereby. Data to be operated are selected by a multiplexer 303, and added by an adder 304. In the adder 304, the rearrangement 201 and the addition 202 in FIG. 2 are carried out.

Subsequently, the multiplication 203 in FIG. 2 is carried out. Output data of 13.0 bits after addition of the adder 304 are distributed to a multiplexer 307 and an adder 306 by a demultiplexer 305. Output data of the adder 306 are applied to the multiplexer 307. Output data of the multiplexer 307 are applied to a multiplier 309, and multiplied by data of 2.17 bits of an inverse DCT coefficient generating unit 308. The output data of the multiplier 309 are applied to a demultiplexer 310, and thereby distributed to an adder 311 and a multiplexer 312. The output data of the adder 311 are applied to the multiplexer 312, and output data of 14.6 bits are obtained every one clock signal. As to operating units for other additions 204, 206 and 207 in FIG. 2, though the respective numbers of bits of data are different from each other, configurations and operations are substantially similar to the above-mentioned operations. Input data are latched by respective demultiplexers 313, 318 and 321 and distributed to respective memories (not shown), and thereby the input data are held. Selections of data to be operated are carried out by multiplexers 314, 319 and 322. Additions are carried out by adders 315, 320 and 323. As to multiplication 205 in FIG. 2, in FIG. 3B, data of 2.12 bits of an inverse DCT coefficient generating unit 316 are multiplied by an input data of 14.4 bits from the adder 315 in a multiplier 317 in a predetermined order. After completion of all operations, one output signal 324 is obtained every one clock signal.

As mentioned above, according to the first embodiment, the operation of the addition and subtraction matrix is carried out prior to operation of each multiplication matrix at all times. Therefore, the number of operation of the addition and subtraction matrix which are carried out after the operation of the multiplication matrix can be reduced. The number of bits of data after operations of the matrixes can be reduced by keeping a desired accuracy. Consequently, in configuration of a hardware, a circuit scale can be reduced.

[Second Embodiment]

A second embodiment in accordance with the present invention is described with reference to FIG. 4, FIG. 5, FIG. 6, FIG. 7, FIG. 8 and FIG. 9.

In a two-dimensional inverse discrete cosine transform apparatus of the second embodiment, a row-column transposition method is applied to a part of plural matrixes such as addition and subtraction matrixes. Tensor product operation is applied to other matrixes in the two-dimensional inverse discrete cosine transform apparatus. For example, as shown in equation (7), four basic operation matrixes of 8 rows and 8 columns are represented by A, B, C, D.

$$Y = DCBA * X * A^T B^T C^T D^T \qquad (7)$$

Figure 4:
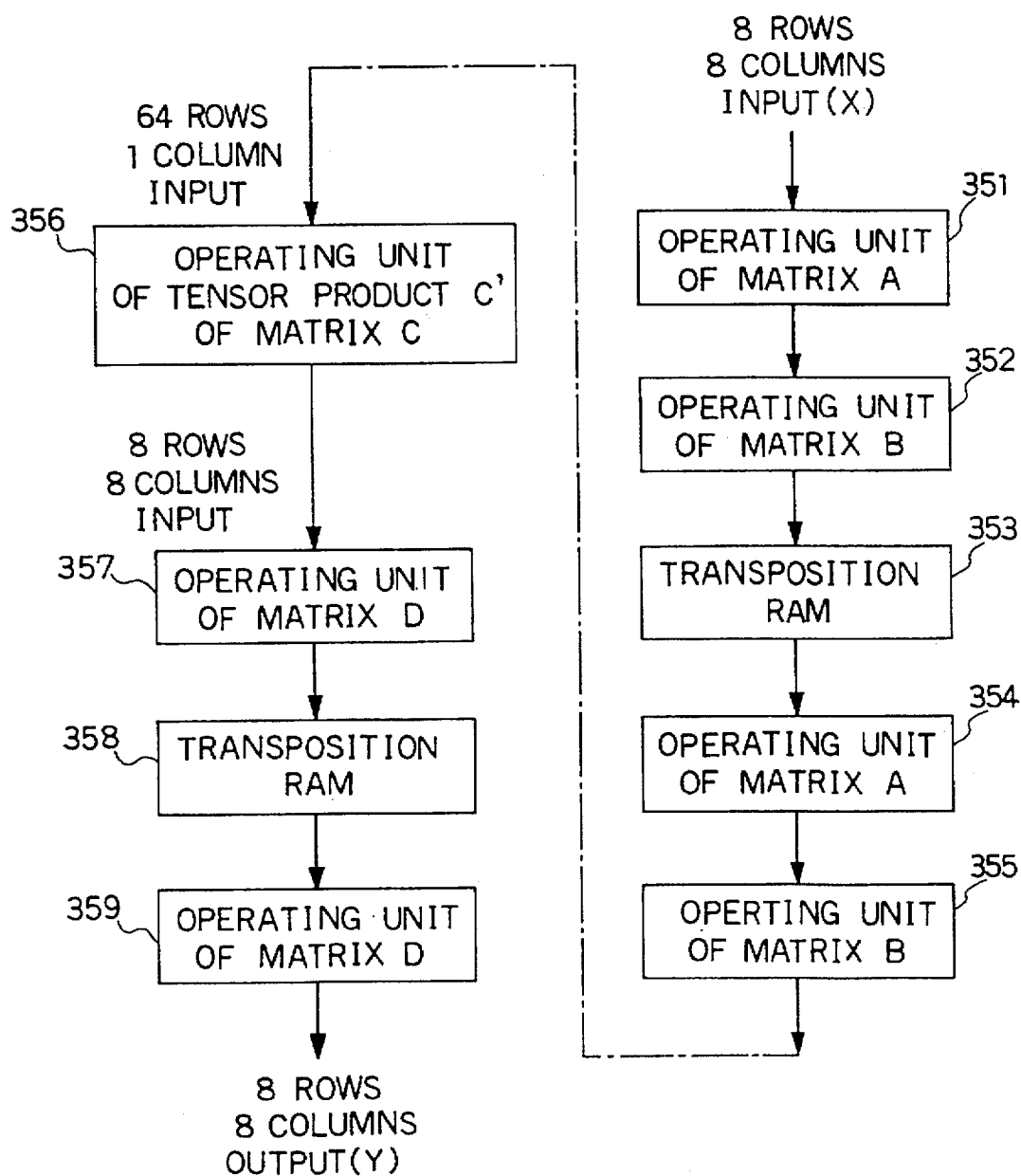
FIG. 4 is a block diagram of the two-dimensional inverse discrete cosine transform apparatus of a second embodiment in accordance with the present invention.
Figure 5:
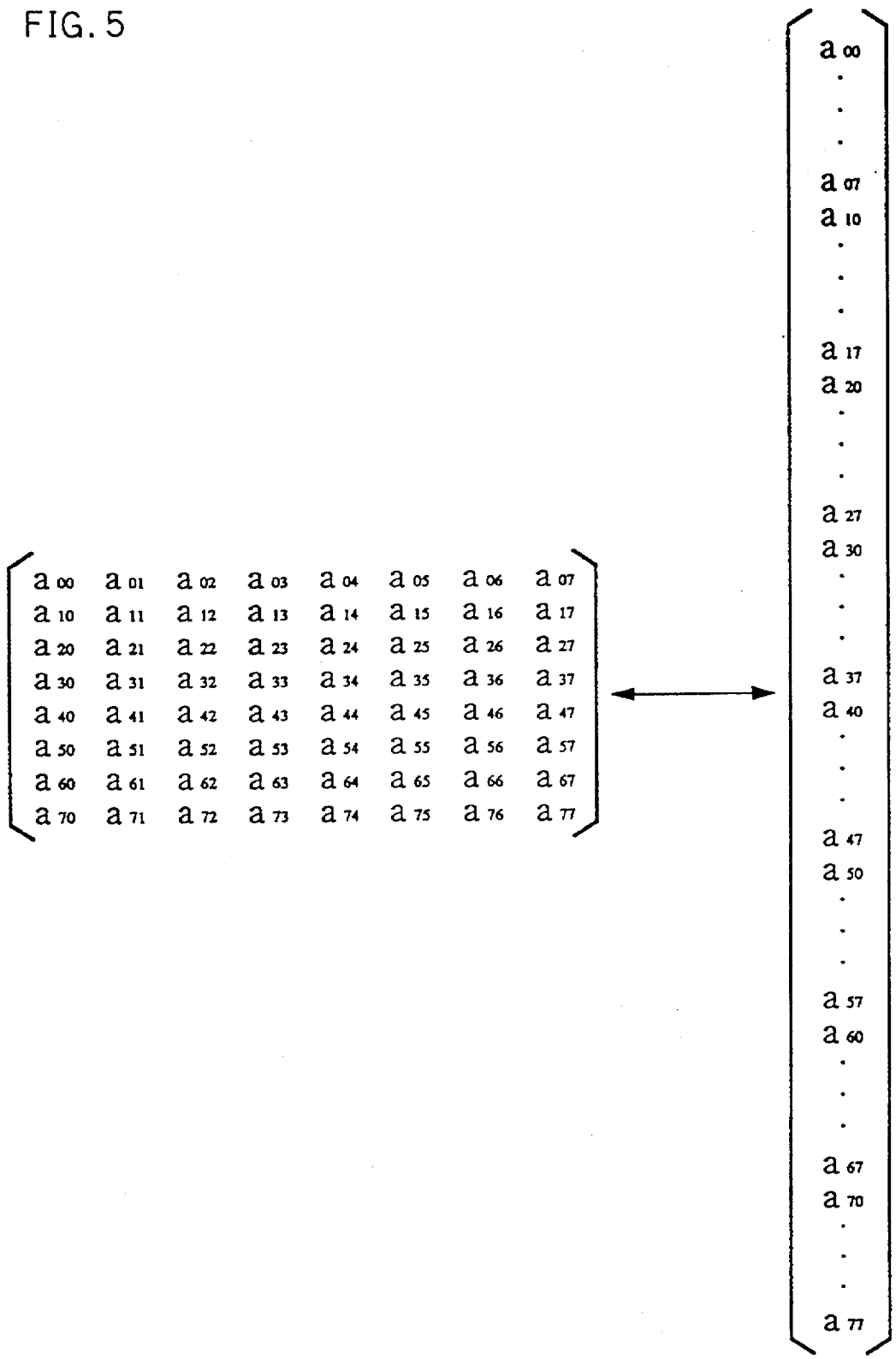
FIG. 5 is an explanation drawing of transposition of row-column in the second embodiment in accordance with the present invention.

Furthermore, transposed matrixes of the basic operation matrixes A, B, C, D are represented by $A^T$, $B^T$, $C^T$, $D^T$, respectively. When an output Y of 8 rows and 8 columns is produced from an input X of 8 rows and 8 columns, the tensor product operation is applied to the basic operation matrix C, and the basic operation matrixes A, B, D are operated by the row-column transposition method. In this case, the two-dimensional inverse discrete cosine transform apparatus is configured as shown in FIG. 4. Referring to FIG. 4, a tensor product C' in an operating unit 356 is a matrix of 64 rows and 64 columns. A matrix of 64 rows and 1 column is inputted to the operating unit 356, and a matrix of 8 rows and 8 columns is output therefrom. Operations of the basic operation matrixes A, B, D are carried out with respect to an input of 8 rows and 8 columns. It means that an output of 8 rows and 8 columns is obtained by performing operations of eight times with respect to eight inputs in the row direction or column direction. Moreover, as shown in FIG. 5, the tensor product operation is carried out in a manner that an input of 8 rows and 8 columns is transposed to an input of 64 rows and 1 column. A resultant output is transposed from the output of 64 rows and 1 column to the output of 8 rows and 8 columns. Particularly in the transposition, if the matrix derived by tensor product operation is a diagonal matrix, a holding device such as a latch or a memory is unnecessary.

An inverse discrete cosine transform apparatus for carrying out operation of matrixes as shown by equation (8) is described hereafter. Equation (8) is derived by deforming equation (6). In equation (8), multiplication matrixes become diagonal matrixes which do not include addition and subtraction operation. Consequently, tensor product operation is simplified, and the multiplication matrixes become diagonal matrixes after the tensor product operation. In the diagonal matrix, as mentioned above, the holding device such as the latch or memory is unnecessary when compared with the first embodiment of equations (5) and (6). Therefore, the circuit scale can be reduced. Derivation of equation (8) is described hereafter.

$$\begin{bmatrix} y_0 \\ y_1 \\ y_2 \\ y_3 \\ y_4 \\ y_5 \\ y_6 \\ y_7 \end{bmatrix} = \frac{1}{2} \begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 0 & 0 & 0 & 1 & 0 & 0 & 0 & -1 \\ 0 & 0 & 1 & 0 & 0 & 0 & -1 & 0 \\ 0 & 1 & 0 & 0 & 0 & -1 & 0 & 0 \\ 1 & 0 & 0 & 0 & -1 & 0 & 0 & 0 \end{bmatrix}$$

$$\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & \frac{1}{2c_1} & 0 & 0 & 0 \\ 0 & 0 & 0 & 0 & 0 & \frac{1}{2c_3} & 0 & 0 \\ 0 & 0 & 0 & 0 & 0 & 0 & \frac{1}{2c_5} & 0 \\ 0 & 0 & 0 & 0 & 0 & 0 & 0 & \frac{1}{2c_7} \end{bmatrix}$$

$$\begin{bmatrix} c_4 & 0 & 0 & 0 & 0 & 0 & 0 & 0 \\ 0 & c_4 & 0 & 0 & 0 & 0 & 0 & 0 \\ 0 & 0 & c_4 & 0 & 0 & 0 & 0 & 0 \\ 0 & 0 & 0 & c_4 & 0 & 0 & 0 & 0 \\ 0 & 0 & 0 & 0 & c_4 & 0 & 0 & 0 \\ 0 & 0 & 0 & 0 & 0 & c_4 & 0 & 0 \\ 0 & 0 & 0 & 0 & 0 & 0 & c_4 & 0 \\ 0 & 0 & 0 & 0 & 0 & 0 & 0 & c_4 \end{bmatrix}$$

$$\begin{bmatrix} 1 & 0 & 0 & 1 & 0 & 0 & 0 & 0 \\ 0 & 1 & 1 & 0 & 0 & 0 & 0 & 0 \\ 0 & 1 & -1 & 0 & 0 & 0 & 0 & 0 \\ 1 & 0 & 0 & -1 & 0 & 0 & 0 & 0 \\ 0 & 0 & 0 & 0 & 1 & 0 & 0 & 1 \\ 0 & 0 & 0 & 0 & 0 & 1 & 1 & 0 \\ 0 & 0 & 0 & 0 & 0 & 1 & -1 & 0 \\ 0 & 0 & 0 & 0 & 1 & 0 & 0 & -1 \end{bmatrix}$$

$$\begin{bmatrix} 1 & 0 & 0 & 0 & 0 & 0 & 0 & 0 \\ 0 & 1 & 0 & 0 & 0 & 0 & 0 & 0 \\ 0 & 0 & \frac{1}{2c_6} & 0 & 0 & 0 & 0 & 0 \\ 0 & 0 & 0 & \frac{1}{2c_2} & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & \frac{1}{2c_6} & 0 \\ 0 & 0 & 0 & 0 & 0 & 0 & 0 & \frac{1}{2c_2} \end{bmatrix}$$

-continued $$\begin{bmatrix} 1 & 1 & 0 & 0 & 0 & 0 & 0 & 0 \\ 1 & -1 & 0 & 0 & 0 & 0 & 0 & 0 \\ 0 & 0 & 1 & -1 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 1 & -1 & 0 & 0 \\ 0 & 0 & 0 & 0 & 0 & 0 & 1 & -1 \\ 0 & 0 & 0 & 0 & 0 & 0 & 1 & 1 \end{bmatrix}$$

$$\begin{bmatrix} 1 & 0 & 0 & 0 & 0 & 0 & 0 & 0 \\ 0 & 1 & 0 & 0 & 0 & 0 & 0 & 0 \\ 0 & 0 & 2c_4 & 0 & 0 & 0 & 0 & 0 \\ 0 & 0 & 0 & 1 & 0 & 0 & 0 & 0 \\ 0 & 0 & 0 & 0 & 2c_4 & 0 & 0 & 0 \\ 0 & 0 & 0 & 0 & 0 & 1 & 0 & 0 \\ 0 & 0 & 0 & 0 & 0 & 0 & 2c_4 & 0 \\ 0 & 0 & 0 & 0 & 0 & 0 & 0 & 1 \end{bmatrix}$$

$$\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 1 & 1 & 0 & 0 & 0 & 0 \\ 0 & 0 & 0 & 0 & 1 & 0 & 0 & 0 \\ 0 & 0 & 0 & 0 & 1 & 1 & 0 & 0 \\ 0 & 0 & 0 & 0 & 1 & 1 & 0 & 0 \\ 0 & 0 & 0 & 0 & 1 & 1 & 1 & 1 \end{bmatrix}$$

$$\begin{bmatrix} 1 & 0 & 0 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 0 & 1 \end{bmatrix} \begin{bmatrix} x_0 \\ x_1 \\ x_2 \\ x_3 \\ x_4 \\ x_5 \\ x_6 \\ x_7 \end{bmatrix}$$

Matrixes as shown by equation (9) are derived by operations of the matrixes $M_{12}$, $M_{13}$, $M_{14}$, $M_{15}$ and $M_{16}$ in equation (2).

$$\begin{bmatrix} 1 & 0 & 1 & 0 & 0 & 0 & 0 & 0 \\ 0 & 1 & 0 & 1 & 0 & 0 & 0 & 0 \\ 0 & 1 & 0 & -1 & 0 & 0 & 0 & 0 \\ 1 & 0 & -1 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix} \begin{bmatrix} 1 & -1 & 0 & 0 & 0 & 0 & 0 & 0 \\ 1 & 1 & 0 & 0 & 0 & 0 & 0 & 0 \\ 0 & 0 & 0 & 1 & 0 & 0 & 0 & 0 \\ 0 & 0 & 1 & -1 & 0 & 0 & 0 & 0 \\ 0 & 0 & 0 & 0 & 0 & -1 & 1 & 0 \\ 0 & 0 & 0 & 0 & 0 & 0 & 0 & 1 \\ 0 & 0 & 0 & 0 & -1 & 0 & -1 & 0 \\ 0 & 0 & 0 & 0 & 1 & 0 & 1 \end{bmatrix} \quad (9)$$

$$\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & c_4 & 0 & 0 & 0 & 0 \\ 0 & 0 & 0 & 0 & 1 & 0 & 0 & 0 \\ 0 & 0 & 0 & 0 & 0 & c_4 & 0 & 0 \\ 0 & 0 & 0 & 0 & 0 & 0 & c_6 & -c_2 \\ 0 & 0 & 0 & 0 & 0 & 0 & c_2 & c_6 \end{bmatrix} \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & -1 & 0 & 0 & 0 & 0 \\ 0 & 0 & 1 & 1 & 0 & 0 & 0 & 0 \\ 0 & 0 & 0 & 0 & 1 & -1 & -1 & 1 \\ 0 & 0 & 0 & 0 & 1 & 1 & -1 & 1 \\ 0 & 0 & 0 & 0 & -1 & 0 & -1 & 0 \\ 0 & 0 & 0 & 0 & 0 & 1 & 0 & 1 \end{bmatrix}$$

$$\begin{bmatrix} c_4 & 0 & 0 & 0 & 0 & 0 & 0 & 0 \\ 0 & c_4 & 0 & 0 & 0 & 0 & 0 & 0 \\ 0 & 0 & \frac{1}{2c_6} & 0 & 0 & 0 & 0 & 0 \\ 0 & 0 & 0 & \frac{1}{2c_2} & 0 & 0 & 0 & 0 \\ 0 & 0 & 0 & 0 & \frac{1}{2c_5} & 0 & 0 & 0 \\ 0 & 0 & 0 & 0 & 0 & \frac{1}{2c_1} & 0 & 0 \\ 0 & 0 & 0 & 0 & 0 & 0 & \frac{1}{2c_3} & 0 \\ 0 & 0 & 0 & 0 & 0 & 0 & 0 & \frac{1}{2c_2} \end{bmatrix} = \begin{bmatrix} c_4 & c_4 & c_2 & c_6 & 0 & 0 & 0 & 0 \\ c_4 & -c_4 & c_6 & -c_2 & 0 & 0 & 0 & 0 \\ c_4 & -c_4 & -c_6 & c_2 & 0 & 0 & 0 & 0 \\ c_4 & c_4 & -c_2 & -c_6 & 0 & 0 & 0 & 0 \\ 0 & 0 & 0 & 0 & c_1 & c_3 & c_5 & c_7 \\ 0 & 0 & 0 & 0 & c_3 & -c_7 & -c_1 & -c_5 \\ 0 & 0 & 0 & 0 & c_5 & -c_1 & c_7 & c_3 \\ 0 & 0 & 0 & 0 & c_7 & -c_5 & c_3 & -c_1 \end{bmatrix} = \begin{bmatrix} L_1 \\ & L_2 \end{bmatrix}$$

Two matrixes $L_1$ and $L_2$ of 4 rows and 4 columns in equation (9) are deformed to matrixes $L_1$ and $L_2$ as shown by equation (10), respectively.

$$L_1 = \begin{bmatrix} 1 & 0 & 0 & 0 \\ 0 & 0 & 1 & 0 \\ 0 & 1 & 0 & 0 \\ 0 & 0 & 0 & 1 \end{bmatrix} \begin{bmatrix} 0 & 0 & 0 & c_4 \\ 0 & 0 & c_4 & 0 \\ 0 & c_4 & 0 & 0 \\ c_4 & 0 & 0 & 0 \end{bmatrix} \begin{bmatrix} 1 & 0 & 0 & -1 \\ 0 & 1 & -1 & 0 \\ 0 & 1 & 1 & 0 \\ 1 & 0 & 0 & 1 \end{bmatrix} \begin{bmatrix} 1 & & & \\ & 1 & & \\ & & \frac{1}{2c_6} & \\ & & & \frac{1}{2c_1} \end{bmatrix} \begin{bmatrix} 1 & 1 & 0 & 0 \\ 1 & -1 & 0 & 0 \\ 0 & 0 & 1 & 1 \\ 0 & 0 & 1 & -1 \end{bmatrix} \begin{bmatrix} 1 & 0 & 0 & 0 \\ 0 & 1 & 0 & 0 \\ 0 & 0 & 2c_4 & 0 \\ 0 & 0 & 0 & 1 \end{bmatrix} \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

$$L_2 = \begin{bmatrix} \frac{1}{2c_1} & & & \\ & \frac{1}{2c_3} & & \\ & & \frac{1}{2c_5} & \\ & & & \frac{1}{2c_7} \end{bmatrix} \begin{bmatrix} 0 & 0 & 0 & c_4 \\ 0 & 0 & c_4 & 0 \\ 0 & c_4 & 0 & 0 \\ c_4 & 0 & 0 & 0 \end{bmatrix} \begin{bmatrix} 1 & 0 & 0 & -1 \\ 0 & 1 & -1 & 0 \\ 0 & 1 & 1 & 0 \\ 1 & 0 & 0 & 1 \end{bmatrix} \begin{bmatrix} 1 & & & \\ & 1 & & \\ & & \frac{1}{2c_6} & \\ & & & \frac{1}{2c_2} \end{bmatrix} \begin{bmatrix} 1 & 1 & 0 & 0 \\ 1 & -1 & 0 & 0 \\ 0 & 0 & 1 & 1 \\ 0 & 0 & 1 & -1 \end{bmatrix} \begin{bmatrix} 0 & 0 & 0 & 2c_4 \\ 0 & 1 & 0 & 0 \\ 0 & 0 & 1 & 0 \\ 2c_4 & 0 & 0 & 0 \end{bmatrix} \begin{bmatrix} 1 & 1 & 1 & 1 \\ 1 & 1 & 1 & 0 \\ 1 & 0 & 1 & 0 \\ 1 & 0 & 0 & 0 \end{bmatrix}$$

(10)

Two matrixes $L_1$ and $L_2$ in equation (10) are combined, and are substituted for the matrixes $M_{12}$–$M_{16}$ from the second to the sixth of equation (2). Consequently, equation (2) is represented by equation (11).

$$\begin{bmatrix} y_0 \\ y_1 \\ y_2 \\ y_3 \\ y_4 \\ y_5 \\ y_6 \\ y_7 \end{bmatrix} = \frac{1}{2} \overset{M_{31}}{\begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 0 & 0 & 0 & 1 & 0 & 0 & 0 & -1 \\ 0 & 0 & 1 & 0 & 0 & 0 & -1 & 0 \\ 0 & 1 & 0 & 0 & 0 & -1 & 0 & 0 \\ 1 & 0 & 0 & 0 & -1 & 0 & 0 & 0 \end{bmatrix}} \quad (11)$$

$$M_{32} \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & \frac{1}{2c_1} & 0 & 0 & 0 \\ 0 & 0 & 0 & 0 & 0 & \frac{1}{2c_3} & 0 & 0 \\ 0 & 0 & 0 & 0 & 0 & 0 & \frac{1}{2c_5} & 0 \\ 0 & 0 & 0 & 0 & 0 & 0 & 0 & \frac{1}{2c_7} \end{bmatrix}$$

$$M_{33} \begin{bmatrix} c_4 & 0 & 0 & 0 & 0 & 0 & 0 & 0 \\ 0 & c_4 & 0 & 0 & 0 & 0 & 0 & 0 \\ 0 & 0 & c_4 & 0 & 0 & 0 & 0 & 0 \\ 0 & 0 & 0 & c_4 & 0 & 0 & 0 & 0 \\ 0 & 0 & 0 & 0 & c_4 & 0 & 0 & 0 \\ 0 & 0 & 0 & 0 & 0 & c_4 & 0 & 0 \\ 0 & 0 & 0 & 0 & 0 & 0 & c_4 & 0 \\ 0 & 0 & 0 & 0 & 0 & 0 & 0 & c_4 \end{bmatrix}$$

$$M_{34} \begin{bmatrix} 1 & 0 & 0 & 1 & 0 & 0 & 0 & 0 \\ 0 & 1 & 1 & 0 & 0 & 0 & 0 & 0 \\ 0 & 1 & -1 & 0 & 0 & 0 & 0 & 0 \\ 1 & 0 & 0 & -1 & 0 & 0 & 0 & 0 \\ 0 & 0 & 0 & 0 & 1 & 0 & 0 & 1 \\ 0 & 0 & 0 & 0 & 0 & 1 & 1 & 0 \\ 0 & 0 & 0 & 0 & 0 & 1 & -1 & 0 \\ 0 & 0 & 0 & 0 & 1 & 0 & 0 & -1 \end{bmatrix}$$

$$M_{35} \begin{bmatrix} 1 & 0 & 0 & 0 & 0 & 0 & 0 & 0 \\ 0 & 1 & 0 & 0 & 0 & 0 & 0 & 0 \\ 0 & 0 & \frac{1}{2c_6} & 0 & 0 & 0 & 0 & 0 \\ 0 & 0 & 0 & \frac{1}{2c_2} & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & \frac{1}{2c_6} & 0 \\ 0 & 0 & 0 & 0 & 0 & 0 & 0 & \frac{1}{2c_2} \end{bmatrix}$$

$$M_{36} \begin{bmatrix} 1 & 1 & 0 & 0 & 0 & 0 & 0 & 0 \\ 1 & -1 & 0 & 0 & 0 & 0 & 0 & 0 \\ 0 & 0 & 1 & -1 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 1 & -1 & 0 & 0 \\ 0 & 0 & 0 & 0 & 0 & 0 & 1 & -1 \\ 0 & 0 & 0 & 0 & 0 & 0 & 1 & 1 \end{bmatrix}$$

$$M_{37} \begin{bmatrix} 1 & 0 & 0 & 0 & 0 & 0 & 0 & 0 \\ 0 & 1 & 0 & 0 & 0 & 0 & 0 & 0 \\ 0 & 0 & 2c_4 & 0 & 0 & 0 & 0 & 0 \\ 0 & 0 & 0 & 1 & 0 & 0 & 0 & 0 \\ 0 & 0 & 0 & 0 & 2c_4 & 0 & 0 & 0 \\ 0 & 0 & 0 & 0 & 0 & 1 & 0 & 0 \\ 0 & 0 & 0 & 0 & 0 & 0 & 2c_4 & 0 \\ 0 & 0 & 0 & 0 & 0 & 0 & 0 & 1 \end{bmatrix}$$

$$M_{38} \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 1 & 1 & 0 & 0 & 0 & 0 \\ 0 & 0 & 0 & 0 & 1 & 0 & 0 & 0 \\ 0 & 0 & 0 & 0 & 0 & 1 & 1 & 0 \\ 0 & 0 & 0 & 0 & 1 & 1 & 0 & 0 \\ 0 & 0 & 0 & 0 & 1 & 1 & 1 & 1 \end{bmatrix}$$

$$M_{39} \begin{bmatrix} 1 & 0 & 0 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 0 & 1 \end{bmatrix} \begin{bmatrix} x_0 \\ x_1 \\ x_2 \\ x_3 \\ x_4 \\ x_5 \\ x_6 \\ x_7 \end{bmatrix}$$

Referring to equation (11), multiplication matrixes $M_{32}$, $M_{33}$, $M_{35}$ and $M_{37}$ are diagonal matrixes. Though the multiplication matrixes $M_{32}$ and $M_{33}$ can be combined to one orthogonal matrix, for convenience of description, the multiplication matrixes $M_{32}$ and $M_{33}$ are represented by separate orthogonal matrixes. In equation (11), respective addition and subtraction matrixes are operated prior to operation of each multiplication matrix at all times. The addition and subtraction matrix $M_{34}$ is operated prior to operation of the multiplication matrixes $M_{32}$ and $M_{33}$. Furthermore, the addition and subtraction matrix $M_{36}$ is operated prior to operation of the multiplication matrix $M_{35}$. The addition and subtraction matrix $M_{38}$ is operated prior to operation of the multiplication matrix $M_{37}$.

Figure 6:
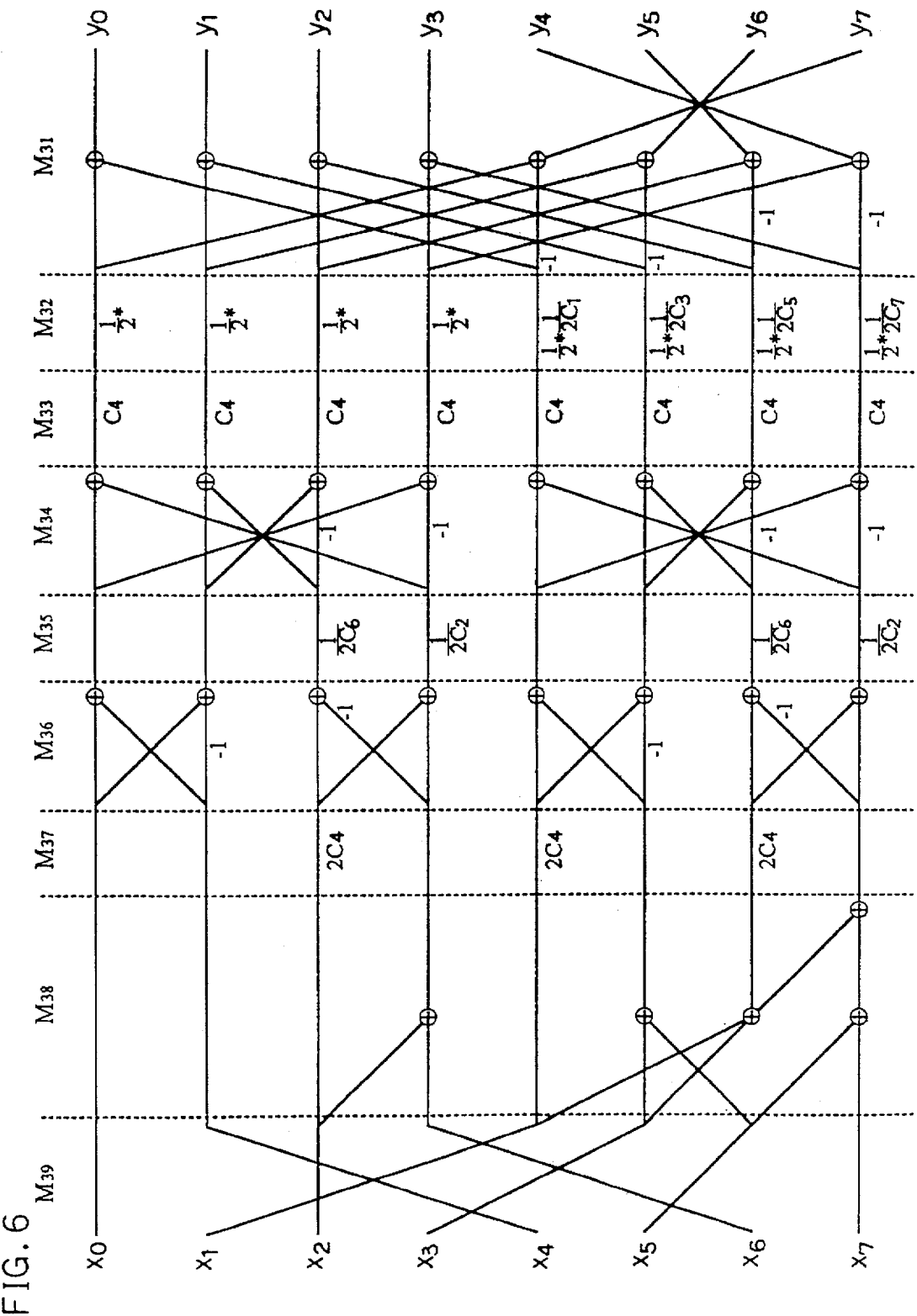
FIG. 6 is a diagram representing process of signals of the inverse discrete cosine transform apparatus of the second embodiment in accordance with the present invention.

FIG. 6 is a diagram representing signal processing of the inverse discrete cosine transform apparatus corresponding to equation (11). Referring to FIG. 6, a sign "+" represents addition by an adder. A numeral "–1" represents inversion of a sign by a sign inverter (not shown). $C_1$, $C_2$, $C_3$, $C_4$, $C_5$, $C_6$ and $C_7$ represent multipliers in multiplication. The multipliers $C_n$ (n:integer) is represented by $C_n = \cos(n\pi/16)$ in general. As shown in FIG. 6, the inverse discrete cosine transform apparatus produces a first output signal $y_0$, a second output signal $y_1$, a third output signal $y_2$, a fourth output signal $y_3$, a fifth output signal $y_4$, a sixth output signal $y_5$, a seventh output signal $y_6$ and eighth output signal $y_7$ from a first input signal $x_0$, a second input signal $x_1$, a third input signal $x_2$, a fourth input signal $x_3$, a fifth input signal $x_4$, a sixth input signal $x_5$, a seventh input signal $x_6$ and an eighth input signal $x_7$. Operations in columns which are sectioned by dotted lines and indicated by $M_{31}$–$M_{39}$ correspond with the operations of the basic operation matrixes $M_{31}$–$M_{39}$ in equation (11), respectively.

Figure 7:
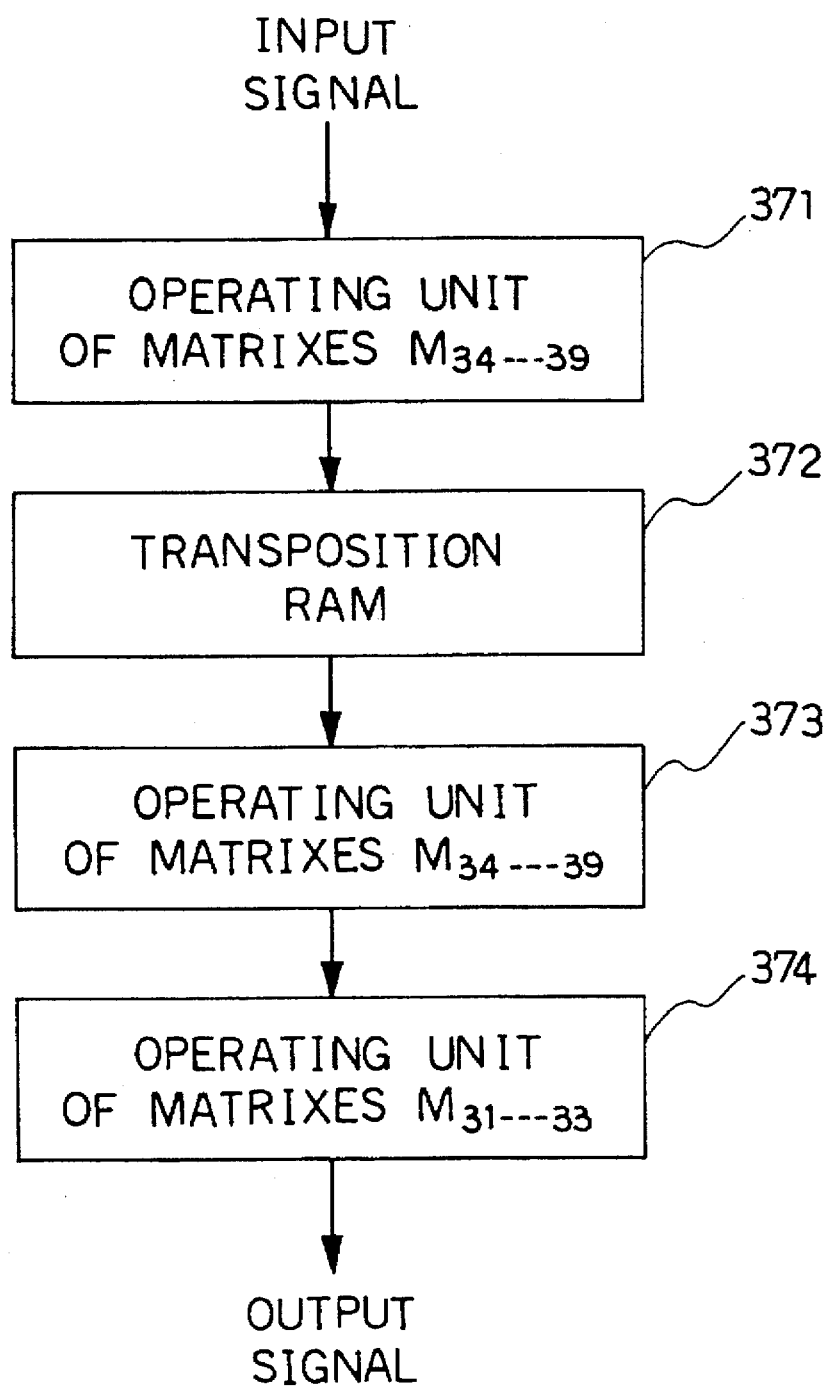
FIG. 7 is a block diagram of the two-dimensional inverse discrete cosine transform apparatus of the second embodiment in accordance with the present invention.

In the signal processing of the inverse discrete cosine transform apparatus in FIG. 6, operations of a part of plural basic operation matrixes are carried out on the basis of two-dimensional matrixes which are derived by tensor product operation. Operations of other basic operation matrixes are carried out by a row-column transposition method. FIG. 7 is a block diagram of a two-dimensional inverse discrete cosine transform apparatus for carrying out the abovementioned operation. Referring to FIG. 7, an operation unit 371 as an operation part in row direction carries out operations of columns of the matrixes $M_{34}$–$M_{39}$, a transposition RAM 372 as a transposition part transposes an operation result of the operation unit 371, and an operation unit 373 as an operation part in column direction carries out a similar operation to that of the operation unit 371. An operation unit 374 which is a two-dimensional operation part performing operation on a two-dimensional matrix obtained by a tensor product operation carries out operations of columns of $M_{31}$–$M_{33}$ in FIG. 6.

Figure 8:
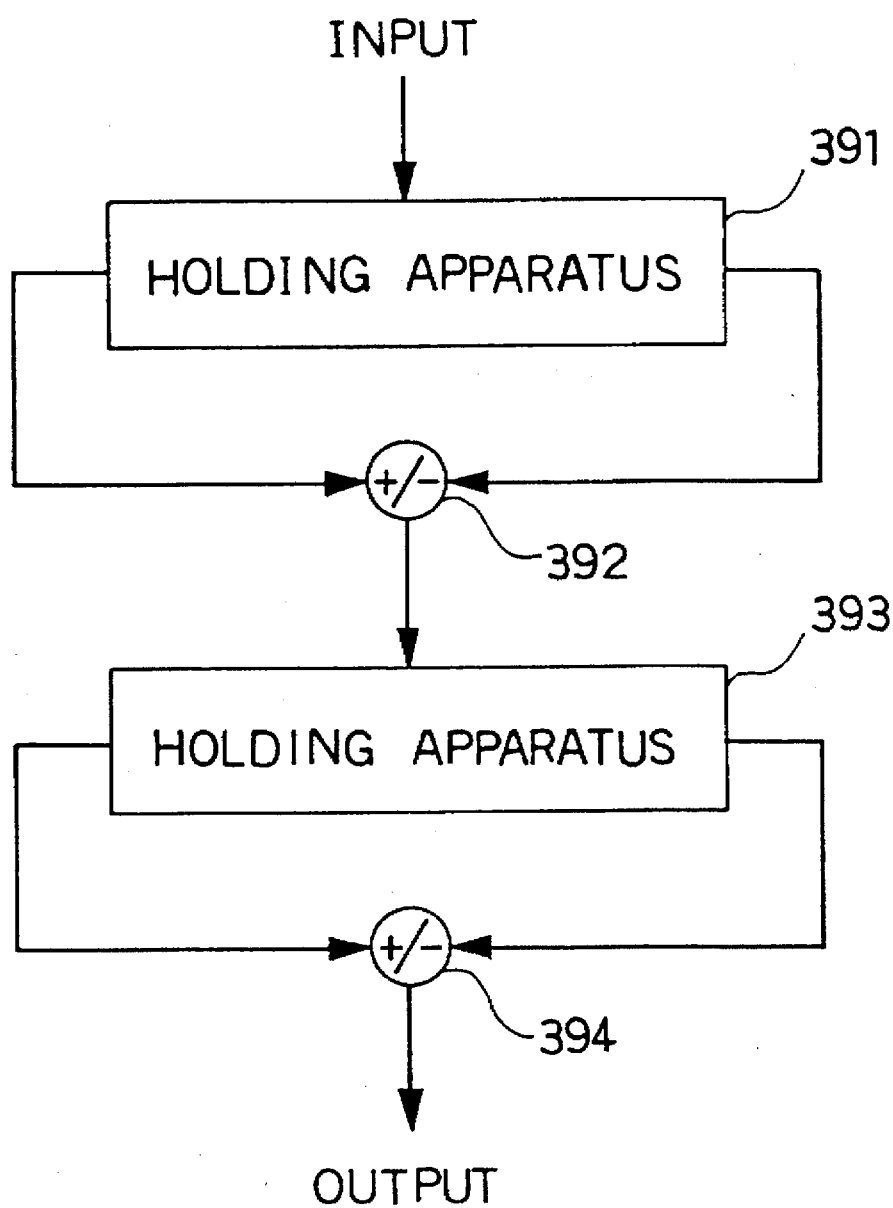
FIG. 8 is a block diagram of a two-dimensional addition processing apparatus of the second embodiment in accordance with the present invention.

As to the matrixes $M_{31}$–$M_{33}$ in equation (11), a hardware for operating two-dimensional matrixes derived by tensor product operation is described hereafter. First, in the matrix $M_{33}$, since all elements on a diagonal are $C_4$ ($=\cos(\pi/4)$), the tensor product of the matrix $M_{33}$ is a diagonal matrix of 64 rows and 64 columns, and the elements on the diagonal are multiplied by ½. In an actual tensor product operation, a multiplier is not needed because the operation can be carried out by shifting one bit. Moreover, since all inputs of 64 rows and 1 column are multiplied by ½, the multiplication can be carried out at an arbitrary operation step. In a manner similar to the matrix $M_{33}$, the matrix $M_{32}$ becomes a diagonal matrix of 64 rows and 64 columns by tensor product operation. A hardware for realizing the operation can be configured by one multiplier because the inputs of 64 rows and 1 column can be multiplied every input of a clock signal in sequence. The matrix $M_{31}$ becomes a matrix of 64 rows and 64 columns by tensor product operation. As shown in FIG. 8, a hardware for carrying out the tensor product operation requires two addition-and-subtraction units 392 and 394, and further, two holding apparatus 391 and 393 such as a latch and a RAM.

A hardware which carries out operation based on the row and column transposition method of one-dimensional matrix is described hereafter. When data are inputted in synchronism with a clock signal, eight inputs of one unit in the direction of a row or a column are inputted by input of 8 clock signals. In this operation, a part of one-dimensional operation forms pipelines for carrying out parallel operations of eight steps. That is, when the addition and the multiplication are carried out in synchronism with the clock signal, one adder and one multiplier are capable of operating eight times.

Referring to FIG. 6, as to multiplications of the matrixes $M_{35}$ and $M_{37}$, the number of multiplications is 7 in total. There are three coefficients $2C_4$, $½C_2$ and $½C_6$ for these multiplications. Three multiplications by the coefficient $2C_4$ which are equivalent to operation of the matrix $M_{37}$ are carried out by input of 8 clock signals in one-dimensional operation. Therefore, in the two-dimensional operation, six multiplications of twice of three are carried out. Since the number of pipelines for carrying out parallel operations is eight, six multiplications by input of 8 clock signals can be carried out by using one multiplier. Moreover, since the coefficient $2C_4$ does not change, the multiplier can be configured by a small scale circuit using only an adder and a shift circuit.

In a similar manner, as to multiplications by two coefficients $½C_2$ and $½C_6$ which are equivalent to operation of the matrix $M_{35}$, four multiplications are carried out in one-dimensional operation. That is, eight multiplications are carried out in two-dimensional operation. Therefore, the multiplier can be configured by a small scale circuit using a multiplexer, an adder and a shift circuit. For example, in the article of the prior art, as described in equations (77)–(80) of the article, twenty-nine additions and thirteen multiplications are carried out in the one-dimensional inverse discrete cosine transform. Therefore, in order to perform these operations by input of 8 clock signals, four adders and two multipliers must be used. Consequently, in order to configure apparatus for two-dimensional inverse discrete cosine transform using the row-column transposition method, eight adders and four multipliers are required because two units of the one-dimensional inverse discrete cosine transform apparatus are required.

As to addition in FIG. 6, operating units of the matrixes $M_{34}$ and $M_{36}$ can be configured by a selector, an addition-and-subtraction unit for outputting an operation result of addition or subtraction of two inputs, a multiplexer, and a latch for holding the operation result. An operation unit of the matrix $M_{38}$ can be configured by a selector, one adder and a latch for holding an operation result.

Eight adders and three multipliers must be used for operations in FIG. 6. Two of three multipliers carry out multiplication by a particular coefficient. In comparison with the above-mentioned prior art which requires eight adders and four multipliers, one multiplier is reduced in the second embodiment. Moreover, a circuit scale can be reduced by using an exclusive multiplier in comparison with the prior art.

Figure 9A:
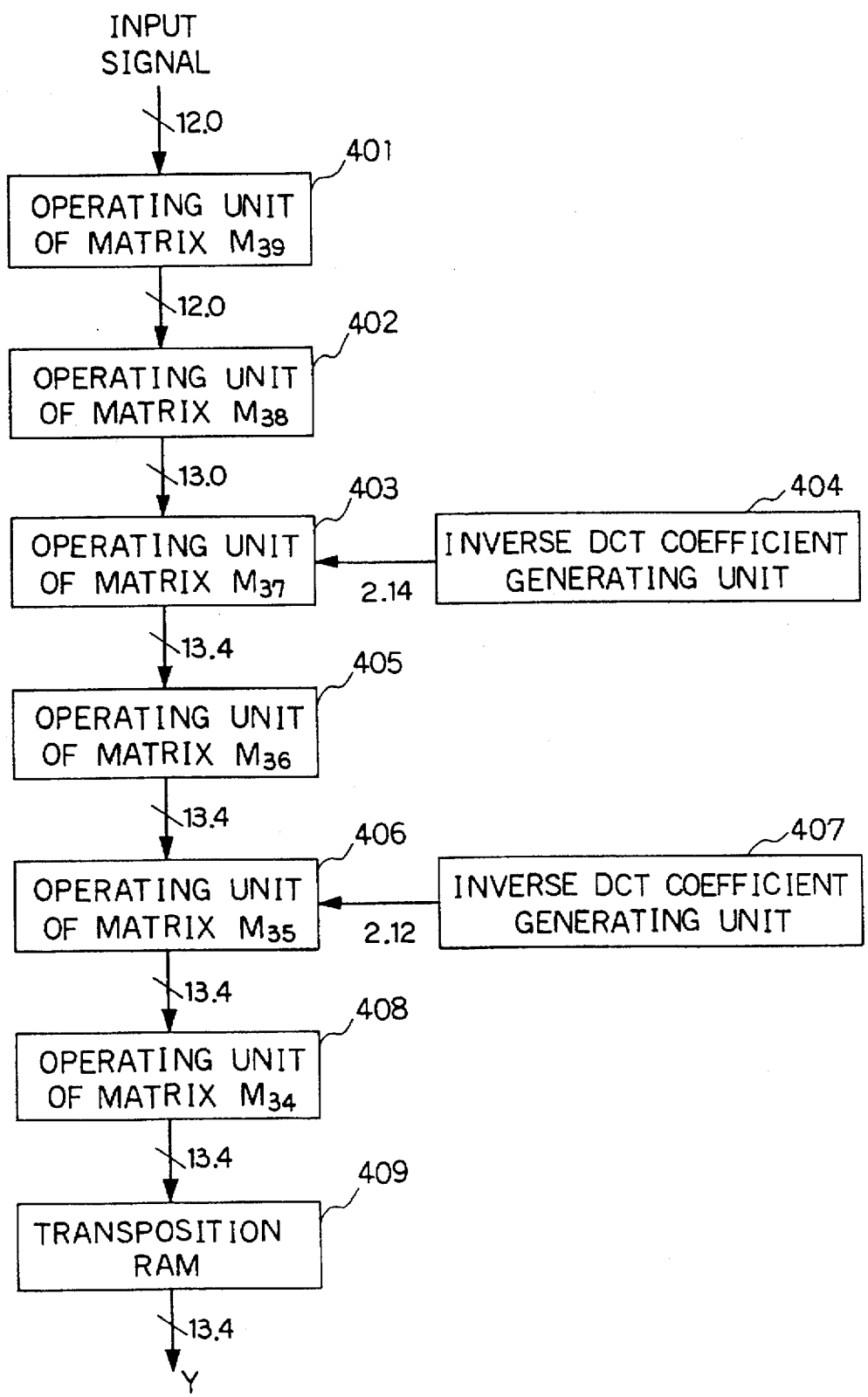

FIG. 9A and FIG. 9B in combination show a block diagram of the two-dimensional inverse discrete cosine transform apparatus of the second embodiment. Referring to FIG. 9A and FIG. 9B, the number of bits which is required to operation of each basic operation matrix is indicated by a numeral value 12.0, for example. In numeral value 12.0, for example, the integral part represents the number (m) of bits of data of integer, and the decimal part represents the number (n) of bits of data of decimal (m and n are integers). The integers m and n represent the numbers of bits which are required for output data after operation of each basic operation matrix.

Moreover, as to multiplications of the matrixes $M_{32}$, $M_{33}$, $M_{35}$ and $M_{37}$ by an inverse DCT coefficient, the numbers of bits of inverse DCT coefficients are indicated under respective arrows representing outputs of inverse DCT coefficient generating units 404, 407, 413, 416 and 419. The indicated number of bits is required in the case that an operating unit is not an exclusive multiplier which is configured by an adder and a shift circuit, but a conventional multiplier. The matrixes $M_{31}$, $M_{32}$ and $M_{33}$ having prime "'" represent tensor products of the respective matrixes. Referring to FIG. 9A and 9B, the number of bits which is required to each operating unit is described hereafter.

First, as to operating units of addition and subtraction of one-dimensional operation, an operating unit 402 of the matrix $M_{38}$ requires 13 bits. An operating unit 405 of the matrix $M_{36}$ and an operating unit 408 of the matrix $M_{34}$ require 17 (=13+4) bits. An operating unit 411 of the matrix $M_{38}$ and an operating unit 414 of the matrix $M_{36}$ require 18 (=14+4) bits. An operating unit 417 of the matrix $M_{34}$ requires 19 (=15+4) bits. As to an operating unit of addition and subtraction of two-dimensional operation, an operating unit 420 of the matrix $M_{31}'$ requires 36 bits twice of 18 bits, and a signal of 18 bits is inputted and a signal of 9 bits is output. In the inverse discrete cosine transform apparatus in the prior art of the paper, it is estimated by the inverter's simulation that four addition and subtraction units of 21 bits and four addition and subtraction units of 19 bits are required. Therefore, it is recognized that the number of bits is reduced as a whole in comparison with the above-mentioned prior art.

Description is made to multiplier hereafter. As to respective operating units 415 and 412 of multiplications of the matrixes $M_{35}$ and $M_{37}$ which are carried out by one-dimensional operation, the number of bits of input data is 14.4 bits. The operating unit 415 comprises an adder, a shift circuit and a rounding circuit (these are not shown) so that the input data are multiplied by an inverse DCT coefficient of 2.12 bits output from the inverse DCT coefficient generating unit 416 and output data of 14.4 bits are obtained. The operating unit 412 also comprises an adder, a shift circuit and a rounding circuit (these are not shown) so that the input data are multiplied by an inverse DCT coefficient of 2.14 bits output from the inverse DCT coefficient generation unit 413 and output data of 14.4 bits are obtained.

The operating unit 418 of matrixes $(M_{32} * M_{33})'$ of two-dimensional operation requires one multiplier so that input data of 15.4 bits are multiplied by an inverse DCT coefficient of 2.11 bits output from the inverse DCT coefficient generating unit 419 and output data of 11.7 bits are obtained. Assessment result of the second embodiment is shown in table 2 which is similar to table 1.

TABLE 2

| Range of random members | Peak mean square error for any of IDCT output pels | Overall mean square error of 64 IDCT output pels | Peak mean error for any of 64 IDCT output pels | mean error of 64 IDCT output pels |
| --- | --- | --- | --- | --- |
| −256–255 | 0.030300 | 0.015877 | 0.003200 | 0.000108 |
| −5–5 | 0.027500 | 0.014764 | 0.003100 | 0.000011 |
| −300–300 | 0.020700 | 0.009533 | 0.002800 | 0.000003 |
| H.261 standard values | 0.06 and below | 0.02 and below | 0.015 and below | 0.0015 and below |

It is recognized that the result of the second embodiment meets the H.261 standard. If the numbers of bits of the output data after operations of the respective matrix are reduced to smaller values than the above-mentioned numbers of bits, a peak error of each of 64 (=8×8) IDCT output pels exceeds 1. Therefore, the assessment result of the second embodiment does not meet the H.261 standard.

As mentioned above, in the second embodiment of the present invention, the number of multipliers can be reduced by combining the operation based on the row-column transposition method and the two-dimensional operation which applies the tensor product operation to a part of plural basic operation matrixes. Moreover, the number of bits of data after operations of the respective basic operation matrixes can be reduced keeping a desired operation accuracy. Consequently, a circuit scale of the inverse discrete cosine transform apparatus can be reduced.

[Third Embodiment]

Figure 10:
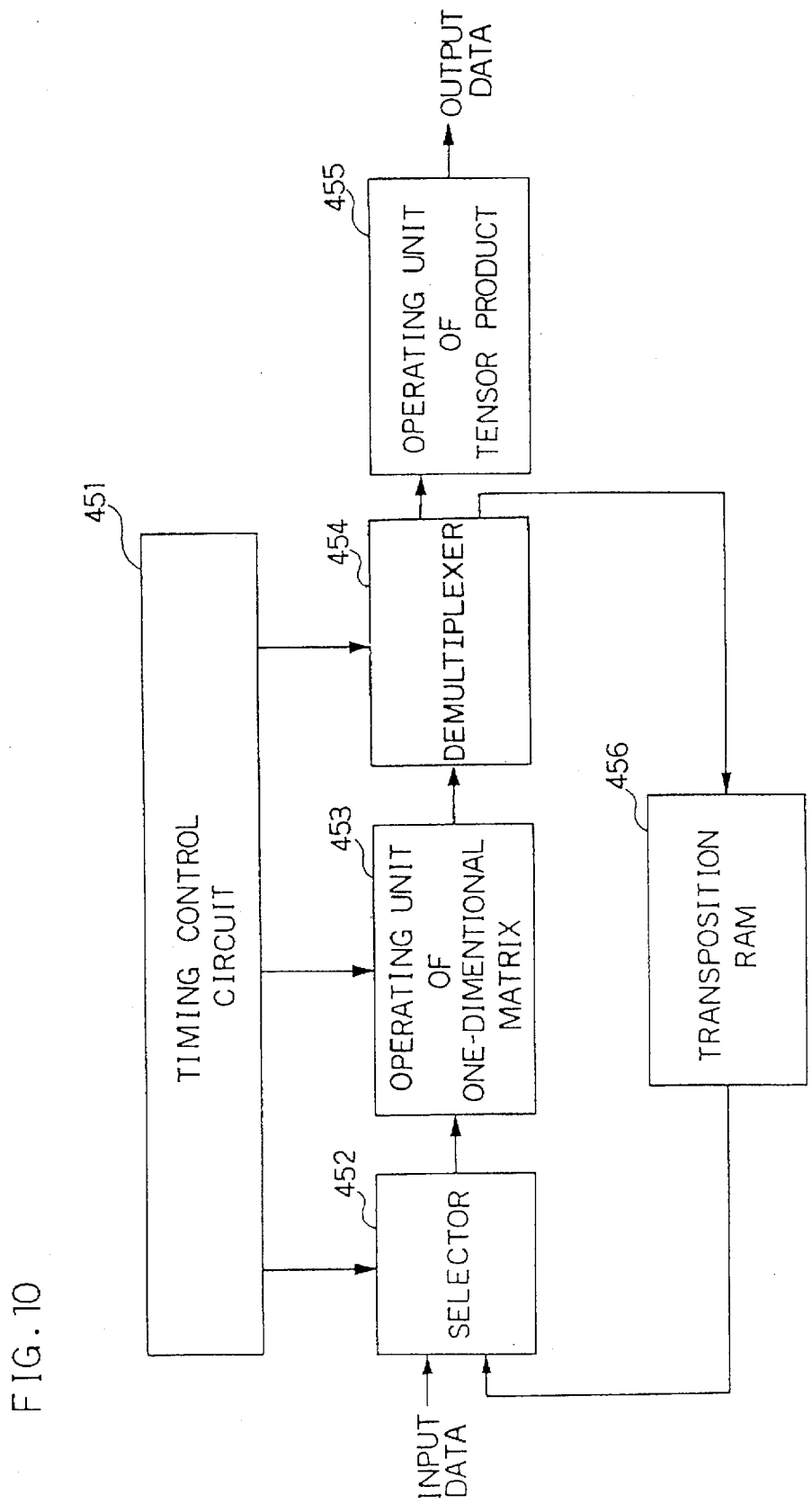
FIG. 10 is a block diagram of the two-dimensional inverse discrete cosine transform apparatus of a third embodiment in accordance with the present invention.

A third embodiment in accordance with the present invention is described with reference to FIG. 10. In the two-dimensional inverse discrete cosine transform apparatus of which a part of the basic operation matrixes is operated by two-dimensional operation based on the tensor product operation and other basic operation matrixes are operated by the row-column transposition method, a circuit which operates on the basis of the row-column transposition method is shown in FIG. 10. Referring to FIG. 10, input data of 8 rows and 8 columns are transmitted to an operating unit 453 of one-dimensional matrix through a selector 452 and operated. Resultant output data are transmitted to a transposition RAM 456 through a demultiplexer 454. The data of 8 rows and 8 columns are inputted to the transposition RAM 456, and the rows and the columns are interchanged in the output. The data output from the transposition RAM 456 are transmitted to the operating unit 453 of one-dimensional matrix through the selector 452, and again operated thereby. Resultant output data are transmitted to an operating unit 455 of tensor product for carrying out two-dimensional operation through the demultiplexer 454 and operated thereby.

The selector 452 for switching between the input data and the data output from the transposition RAM 456 is controlled by a timing control circuit 451. The demultiplexer 454 for switching the output of the operating unit 453 of one-dimensional matrix between the operating unit 455 and the transposition RAM 456 is also controlled by the timing control circuit 451.

In the third embodiment as mentioned above, the operation by the row-column transposition method is repeated twice by using one operating unit 453 of one-dimensional matrix, and thereby, the two-dimensional operation is attained. Therefore, a circuit scale of the operating unit 453 of one-dimensional matrix is reduced.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

What is claimed is:

1. An inverse discrete cosine transform (DCT) apparatus for carrying out a one-dimensional inverse discrete cosine transform by combining plural matrix operation means for operating basic operation matrixes of rearrangement, addition and subtraction, multiplication and shift, said inverse discrete cosine transform apparatus comprising:

operation means for performing operations wherein an inverse DCT coefficient $C_n$ is represented by $C_n = \cos(n\pi/16)$ (n:integer), and said plural basic operation matrixes produce a first output signal, a second output signal, a third output signal, a fourth output signal, a fifth output signal, a sixth output signal, a seventh output signal and an eighth output signal from a first input signal, a second input signal, a third input signal, a fourth input signal, a fifth input signal, a sixth input signal, a seventh input signal and an eighth input signal by using the following equation:

$$\begin{bmatrix} y_0 \\ y_1 \\ y_2 \\ y_3 \\ y_4 \\ y_5 \\ y_6 \\ y_7 \end{bmatrix} = \frac{1}{2} \overset{M_{21}}{\begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 0 & 0 & 0 & 1 & 0 & 0 & 0 & -1 \\ 0 & 0 & 1 & 0 & 0 & 0 & -1 & 0 \\ 0 & 1 & 0 & 0 & 0 & -1 & 0 & 0 \\ 1 & 0 & 0 & 0 & -1 & 0 & 0 & 0 \end{bmatrix}}$$

$$M_{22} = \begin{bmatrix} 1 & 0 & 1 & 0 & 0 & 0 & 0 & 0 \\ 0 & 1 & 0 & 1 & 0 & 0 & 0 & 0 \\ 0 & 1 & 0 & -1 & 0 & 0 & 0 & 0 \\ 1 & 0 & -1 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}$$

$$M_{23} = \begin{bmatrix} c_4 & 0 & 0 & 0 & 0 & 0 & 0 & 0 \\ 0 & c_4 & 0 & 0 & 0 & 0 & 0 & 0 \\ 0 & 0 & \frac{1}{2c_2} & 0 & 0 & 0 & 0 & 0 \\ 0 & 0 & 0 & \frac{1}{2c_6} & 0 & 0 & 0 & 0 \\ 0 & 0 & 0 & 0 & \frac{1}{2c_1} & 0 & 0 & 0 \\ 0 & 0 & 0 & 0 & 0 & \frac{1}{2c_3} & 0 & 0 \\ 0 & 0 & 0 & 0 & 0 & 0 & \frac{1}{2c_6} & 0 \\ 0 & 0 & 0 & 0 & 0 & 0 & 0 & \frac{1}{2c_7} \end{bmatrix}$$

$$M_{24} = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 1 & 0 & 0 & 0 & 0 \\ 0 & 0 & 1 & -1 & 0 & 0 & 0 & 0 \\ 0 & 0 & 0 & 0 & 1 & 1 & 0 & 1 \\ 0 & 0 & 0 & 0 & 1 & -1 & 1 & 0 \\ 0 & 0 & 0 & 0 & 1 & -1 & -1 & 0 \\ 0 & 0 & 0 & 0 & 1 & 1 & 0 & -1 \end{bmatrix}$$

$$M_{25} = \begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & c_4 & 0 & 0 & 0 & 0 \\ 0 & 0 & 0 & 0 & 1 & 0 & 0 & 0 \\ 0 & 0 & 0 & 0 & 0 & c_4 & 0 & 0 \\ 0 & 0 & 0 & 0 & 0 & 0 & c_6 & -c_2 \\ 0 & 0 & 0 & 0 & 0 & 0 & c_2 & c_6 \end{bmatrix}$$

$$M_{26} = \begin{bmatrix} 1 & 1 & 0 & 0 & 0 & 0 & 0 & 0 \\ 1 & -1 & 0 & 0 & 0 & 0 & 0 & 0 \\ 0 & 0 & 1 & 0 & 0 & 0 & 0 & 0 \\ 0 & 0 & 1 & 1 & 0 & 0 & 0 & 0 \\ 0 & 0 & 0 & 0 & 1 & 0 & 0 & 0 \\ 0 & 0 & 0 & 0 & 0 & 1 & 1 & 0 \\ 0 & 0 & 0 & 0 & 1 & 1 & 0 & 0 \\ 0 & 0 & 0 & 0 & 0 & 0 & 1 & 1 \end{bmatrix}$$

$$M_{27} \begin{bmatrix} x_0 \\ x_1 \\ x_2 \\ x_3 \\ x_4 \\ x_5 \\ x_6 \\ x_7 \end{bmatrix} = \begin{bmatrix} 1 & 0 & 0 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 0 & 1 \end{bmatrix} \begin{bmatrix} x_0 \\ x_1 \\ x_2 \\ x_3 \\ x_4 \\ x_5 \\ x_6 \\ x_7 \end{bmatrix}$$

and said operation means comprises a rearrangement operation part for carrying out rearrangement according to a first operation matrix $M_{27}$, a first addition and subtraction operation part for carrying out addition and subtraction according to a second operation matrix $M_{26}$, a first multiplication operation part for carrying out multiplication according to a third operation matrix $M_{25}$, a second addition and subtraction operation part for carrying out addition and subtraction according to a fourth operation matrix $M_{24}$, a second multiplication operation part for carrying out multiplication according to a fifth operation matrix $M_{23}$, a third addition and subtraction operation part for carrying out addition and subtraction according to a sixth operation matrix $M_{22}$, and a fourth addition and subtraction operation part for carrying out addition and subtraction according to a seventh operation matrix $M_{21}$, wherein a shift rightward occurs for respective results of said seven operations according to the respective operation matrixes by one bit, said operation means carrying out operations of said basic operation matrixes of addition and subtraction prior to operations of respective basic operation matrixes of multiplication.

2. An inverse discrete cosine transform apparatus in accordance with claim 1 further comprising:

two-dimensional inverse discrete cosine transform apparatus for producing a two-dimensional output signal from a two-dimensional input signal by using operation matrixes obtained by tensor product operation of said basic operation matrixes in said equation.

3. An inverse discrete cosine transform apparatus for carrying out two-dimensional inverse discrete cosine transform by using a row-column transform method in which a one-dimensional inverse discrete cosine transform is carried out with respect to row direction and column direction of a two-dimensional input signal and a two-dimensional output signal is output, the apparatus comprising:

an operating unit of matrixes $M_{34}$–$M_{39}$ for carrying out in row direction a rearrangement operation according to a first operation matrix $M_{39}$, an addition and subtraction operation according to a second operation matrix $M_{38}$, a multiplication operation according to a third operation matrix $M_{37}$, an addition and subtraction operation according to a fourth operation matrix $M_{36}$, a multiplication operation according to a fifth operation matrix $M_{35}$, and an addition and subtraction operation according to a sixth operation matrix $M_{34}$, a transposition part for holding output data of said operation unit of matrixes $M_{34}$–$M_{39}$ and outputting said output data by interchanging row and column, an operating unit of matrixes $M_{34}$–$M_{39}$ for carrying out in column direction a rearrangement operation according to the first operation matrix $M_{39}$, an addition and subtraction operation according to the second operation matrix $M_{38}$, a multiplication operation according to the third operation matrix $M_{37}$, an addition and subtraction operation according to the fourth operation matrix $M_{36}$, a multiplication operation according to the fifth operation matrix $M_{35}$, and an addition and subtraction operation according to the sixth operation matrix $M_{34}$, an operating unit of matrixes $M_{31}$–$M_{33}$ of two-dimensional operation for carrying out a multiplication operation according to an operation matrix obtained by deriving a tensor product from a seventh operation matrix $M_{33}$, a multiplication operation according to an operation matrix obtained by deriving a tensor product from an eighth operation matrix $M_{32}$, and an addition and subtraction operation according to an operation matrix obtained by deriving a tensor product from a ninth operation matrix $M_{31}$, so that the two-dimensional inverse discrete cosine transform is carried out by combining a row-column transposition method and the two-dimensional operation by tensor product on the basis of one-dimensional inverse discrete cosine transforms represented by the following equation:

$$\begin{bmatrix} y_0 \\ y_1 \\ y_2 \\ y_3 \\ y_4 \\ y_5 \\ y_6 \\ y_7 \end{bmatrix} = \frac{1}{2} \overset{M_{31}}{\begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 0 & 0 & 0 & 1 & 0 & 0 & 0 & -1 \\ 0 & 0 & 1 & 0 & 0 & 0 & -1 & 0 \\ 0 & 1 & 0 & 0 & 0 & -1 & 0 & 0 \\ 1 & 0 & 0 & 0 & -1 & 0 & 0 & 0 \end{bmatrix}}$$

$$M_{32}$$
$$\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & 1 & 0 & 0 & 0 & 0 \\ 0 & 0 & 0 & 0 & \frac{1}{2c_1} & 0 & 0 & 0 \\ 0 & 0 & 0 & 0 & 0 & \frac{1}{2c_3} & 0 & 0 \\ 0 & 0 & 0 & 0 & 0 & 0 & \frac{1}{2c_5} & 0 \\ 0 & 0 & 0 & 0 & 0 & 0 & 0 & \frac{1}{2c_7} \end{bmatrix}$$

$$M_{33}$$
$$\begin{bmatrix} c_4 & 0 & 0 & 0 & 0 & 0 & 0 & 0 \\ 0 & c_4 & 0 & 0 & 0 & 0 & 0 & 0 \\ 0 & 0 & c_4 & 0 & 0 & 0 & 0 & 0 \\ 0 & 0 & 0 & c_4 & 0 & 0 & 0 & 0 \\ 0 & 0 & 0 & 0 & c_4 & 0 & 0 & 0 \\ 0 & 0 & 0 & 0 & 0 & c_4 & 0 & 0 \\ 0 & 0 & 0 & 0 & 0 & 0 & c_4 & 0 \\ 0 & 0 & 0 & 0 & 0 & 0 & 0 & c_4 \end{bmatrix}$$

$$M_{34}$$
$$\begin{bmatrix} 1 & 0 & 0 & 1 & 0 & 0 & 0 & 0 \\ 0 & 1 & 1 & 0 & 0 & 0 & 0 & 0 \\ 0 & 1 & -1 & 0 & 0 & 0 & 0 & 0 \\ 1 & 0 & 0 & -1 & 0 & 0 & 0 & 0 \\ 0 & 0 & 0 & 0 & 1 & 0 & 0 & 1 \\ 0 & 0 & 0 & 0 & 0 & 1 & 1 & 0 \\ 0 & 0 & 0 & 0 & 0 & 1 & -1 & 0 \\ 0 & 0 & 0 & 0 & 1 & 0 & 0 & -1 \end{bmatrix}$$

$$M_{35}$$
$$\begin{bmatrix} 1 & 0 & 0 & 0 & 0 & 0 & 0 & 0 \\ 0 & 1 & 0 & 0 & 0 & 0 & 0 & 0 \\ 0 & 0 & \frac{1}{2c_6} & 0 & 0 & 0 & 0 & 0 \\ 0 & 0 & 0 & \frac{1}{2c_2} & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & \frac{1}{2c_6} & 0 \\ 0 & 0 & 0 & 0 & 0 & 0 & 0 & \frac{1}{2c_2} \end{bmatrix}$$

$$M_{36}$$
$$\begin{bmatrix} 1 & 1 & 0 & 0 & 0 & 0 & 0 & 0 \\ 1 & -1 & 0 & 0 & 0 & 0 & 0 & 0 \\ 0 & 0 & 1 & -1 & 0 & 0 & 0 & 0 \\ 0 & 0 & 1 & 1 & 0 & 0 & 0 & 0 \\ 0 & 0 & 0 & 0 & 1 & 1 & 0 & 0 \\ 0 & 0 & 0 & 0 & 1 & -1 & 0 & 0 \\ 0 & 0 & 0 & 0 & 0 & 0 & 1 & -1 \\ 0 & 0 & 0 & 0 & 0 & 0 & 1 & 1 \end{bmatrix}$$

$$M_{37}$$
$$\begin{bmatrix} 1 & 0 & 0 & 0 & 0 & 0 & 0 & 0 \\ 0 & 1 & 0 & 0 & 0 & 0 & 0 & 0 \\ 0 & 0 & 2c_4 & 0 & 0 & 0 & 0 & 0 \\ 0 & 0 & 0 & 1 & 0 & 0 & 0 & 0 \\ 0 & 0 & 0 & 0 & 2c_4 & 0 & 0 & 0 \\ 0 & 0 & 0 & 0 & 0 & 1 & 0 & 0 \\ 0 & 0 & 0 & 0 & 0 & 0 & 2c_4 & 0 \\ 0 & 0 & 0 & 0 & 0 & 0 & 0 & 1 \end{bmatrix}$$

-continued $M_{38}$ $$\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 1 & 1 & 0 & 0 & 0 & 0 \\ 0 & 0 & 0 & 0 & 1 & 0 & 0 & 0 \\ 0 & 0 & 0 & 0 & 0 & 1 & 1 & 0 \\ 0 & 0 & 0 & 0 & 1 & 1 & 0 & 0 \\ 0 & 0 & 0 & 0 & 1 & 1 & 1 & 1 \end{bmatrix}$$

$M_{39}$ $$\begin{bmatrix} 1 & 0 & 0 & 0 & 0 & 0 & 0 & 0 \\ 0 & 0 & 0 & 0 & 1 & 0 & 0 & 0 \\ 0 & 0 & 1 & 0 & 0 & 0 & 0 & 0 \\ 0 & 0 & 0 & 0 & 0 & 0 & 1 & 0 \\ 0 & 1 & 0 & 0 & 0 & 0 & 0 & 0 \\ 0 & 0 & 0 & 1 & 0 & 0 & 0 & 0 \\ 0 & 0 & 0 & 0 & 0 & 1 & 0 & 0 \\ 0 & 0 & 0 & 0 & 0 & 0 & 0 & 1 \end{bmatrix} \begin{bmatrix} x_0 \\ x_1 \\ x_2 \\ x_3 \\ x_4 \\ x_5 \\ x_6 \\ x_7 \end{bmatrix}$$

4. An inverse discrete cosine transform apparatus in accordance with claim 3 further comprising:

a selector for selecting one of a two-dimensional input signal and the output signal of said transposition part, a demultiplexer for selecting one data output from said operating unit in row direction, said operating unit in column direction, said transposition part, and said operating unit of matrixes $M_{31}$–$M_{33}$, and outputting to operating unit of tensor product or said transposition part, so that the two-dimensional inverse discrete cosine transform is carried out by performing operation in row direction by operation in column direction by controlling a timing.

5. An inverse discrete cosine transform (IDCT) apparatus for performing a one-dimensional IDCT, the apparatus comprising:

means for combining plural matrix operation means for operating basic operation matrixes of rearrangement, addition and subtraction, multiplication and shift;

operation means for performing operations wherein an IDCT coefficient $C_n$ is represented by $C_n=\cos(n\pi/16)$ (n:integer); and means for generating a first output signal, a second output signal, a third output signal, a fourth output signal, a fifth output signal, a sixth output signal, a seventh output signal and an eighth output signal from a first input signal, a second input signal, a third input signal, a fourth input signal, a fifth input signal, a sixth input signal, a seventh input signal and an eighth input signal by using the following equation:

$$\begin{bmatrix} y_0 \\ y_1 \\ y_2 \\ y_3 \\ y_4 \\ y_5 \\ y_6 \\ y_7 \end{bmatrix} = \frac{1}{2} \overset{M_{21}}{\begin{bmatrix} 1 & 0 & 0 & 0 & 1 & 0 & 0 & 0 \\ 0 & 1 & 0 & 0 & 0 & 1 & 0 & 0 \\ 0 & 0 & 1 & 0 & 0 & 0 & 1 & 0 \\ 0 & 0 & 0 & 1 & 0 & 0 & 0 & 1 \\ 0 & 0 & 0 & 1 & 0 & 0 & 0 & -1 \\ 0 & 0 & 1 & 0 & 0 & 0 & -1 & 0 \\ 0 & 1 & 0 & 0 & 0 & -1 & 0 & 0 \\ 1 & 0 & 0 & 0 & -1 & 0 & 0 & 0 \end{bmatrix}}$$

$M_{22}$ $$\begin{bmatrix} 1 & 0 & 1 & 0 & 0 & 0 & 0 & 0 \\ 0 & 1 & 0 & 1 & 0 & 0 & 0 & 0 \\ 0 & 1 & 0 & -1 & 0 & 0 & 0 & 0 \\ 1 & 0 & -1 & 0 & 0 & 0 & 0 & 0 \\ 0 & 0 & 0 & 0 & 1 & 0 & 0 & 0 \\ 0 & 0 & 0 & 0 & 0 & 1 & 0 & 0 \\ 0 & 0 & 0 & 0 & 0 & 0 & 1 & 0 \\ 0 & 0 & 0 & 0 & 0 & 0 & 0 & 1 \end{bmatrix}$$

$M_{23}$ $$\begin{bmatrix} c_4 & 0 & 0 & 0 & 0 & 0 & 0 & 0 \\ 0 & c_4 & 0 & 0 & 0 & 0 & 0 & 0 \\ 0 & 0 & \frac{1}{2c_2} & 0 & 0 & 0 & 0 & 0 \\ 0 & 0 & 0 & \frac{1}{2c_6} & 0 & 0 & 0 & 0 \\ 0 & 0 & 0 & 0 & \frac{1}{2c_1} & 0 & 0 & 0 \\ 0 & 0 & 0 & 0 & 0 & \frac{1}{2c_3} & 0 & 0 \\ 0 & 0 & 0 & 0 & 0 & 0 & \frac{1}{2c_6} & 0 \\ 0 & 0 & 0 & 0 & 0 & 0 & 0 & \frac{1}{2c_7} \end{bmatrix}$$

$M_{24}$ $$\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 1 & 0 & 0 & 0 & 0 \\ 0 & 0 & 1 & -1 & 0 & 0 & 0 & 0 \\ 0 & 0 & 0 & 0 & 1 & 1 & 0 & 1 \\ 0 & 0 & 0 & 0 & 1 & -1 & 1 & 0 \\ 0 & 0 & 0 & 0 & 1 & -1 & -1 & 0 \\ 0 & 0 & 0 & 0 & 1 & 1 & 0 & -1 \end{bmatrix}$$

$M_{25}$ $$\begin{bmatrix} 1 & 0 & 0 & 0 & 0 & 0 & 0 & 0 \\ 0 & 1 & 0 & 0 & 0 & 0 & 0 & 0 \\ 0 & 0 & 1 & 0 & 0 & 0 & 0 & 0 \\ 0 & 0 & 0 & c_4 & 0 & 0 & 0 & 0 \\ 0 & 0 & 0 & 0 & 1 & 0 & 0 & 0 \\ 0 & 0 & 0 & 0 & 0 & c_4 & 0 & 0 \\ 0 & 0 & 0 & 0 & 0 & 0 & c_6 & -c_2 \\ 0 & 0 & 0 & 0 & 0 & 0 & c_2 & c_6 \end{bmatrix}$$

$M_{26}$ $$\begin{bmatrix} 1 & 1 & 0 & 0 & 0 & 0 & 0 & 0 \\ 1 & -1 & 0 & 0 & 0 & 0 & 0 & 0 \\ 0 & 0 & 1 & 0 & 0 & 0 & 0 & 0 \\ 0 & 0 & 1 & 1 & 0 & 0 & 0 & 0 \\ 0 & 0 & 0 & 0 & 1 & 0 & 0 & 0 \\ 0 & 0 & 0 & 0 & 0 & 1 & 1 & 0 \\ 0 & 0 & 0 & 0 & 1 & 1 & 0 & 0 \\ 0 & 0 & 0 & 0 & 0 & 0 & 1 & 1 \end{bmatrix}$$

-continued $$M_{27}\begin{bmatrix}1&0&0&0&0&0&0&0\\0&0&0&0&1&0&0&0\\0&0&1&0&0&0&0&0\\0&0&0&0&0&0&1&0\\0&1&0&0&0&0&0&0\\0&0&0&1&0&0&0&0\\0&0&0&0&0&1&0&0\\0&0&0&0&0&0&0&1\end{bmatrix}\begin{bmatrix}x_0\\x_1\\x_2\\x_3\\x_4\\x_5\\x_6\\x_7\end{bmatrix}$$

said operation means including:
- a rearrangement operation part for carrying out rearrangement according to a first operation matrix $M_{27}$,
- a first addition and subtraction operation part for carrying out addition and subtraction according to a second operation matrix $M_{26}$,
- a first multiplication operation part for carrying out multiplication according to a third operation matrix $M_{25}$,
- a second addition and subtraction operation part for carrying out addition and subtraction according to a fourth operation matrix $M_{24}$,
- a second multiplication operation part for carrying out multiplication according to a fifth operation matrix $M_{23}$,
- a third addition and subtraction operation part for carrying out addition and subtraction according to a sixth operation matrix $M_{22}$, and
- a fourth addition and subtraction operation part for carrying out addition and subtraction according to a seventh operation matrix $M_{21}$, wherein a shift rightward occurs for respective results of said seven operations according to the respective operation matrixes by one bit, said operation means carrying out operations of said basic operation matrixes of addition and subtraction prior to operations of respective basic operation matrixes of multiplication.

6. An inverse discrete cosine transform apparatus in accordance with claim 5 further comprising:
two-dimensional inverse discrete cosine transform apparatus for producing a two-dimensional output signal from a two-dimensional input signal by using operation matrixes obtained by tensor product operation of said basic operation matrixes in said equation.

\* \* \* \* \*